(12) United States Patent
Suzuki et al.

(10) Patent No.: US 8,211,515 B2
(45) Date of Patent: Jul. 3, 2012

(54) OPTICAL COMPENSATION SHEET, PROCESS FOR PRODUCING THE SAME, AND POLARIZING PLATE AND LIQUID CRYSTAL DISPLAY DEVICE USING THE SAME

(75) Inventors: Satomi Suzuki, Minami-ashigara (JP); Ichiro Amimori, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 781 days.

(21) Appl. No.: 11/794,200

(22) PCT Filed: Dec. 28, 2005

(86) PCT No.: PCT/JP2005/024259
§ 371 (c)(1),
(2), (4) Date: Jun. 26, 2007

(87) PCT Pub. No.: WO2006/070933
PCT Pub. Date: Jul. 6, 2006

(65) Prior Publication Data
US 2008/0220246 A1    Sep. 11, 2008

(30) Foreign Application Priority Data

Dec. 28, 2004 (JP) ................................ 2004-378943
Feb. 4, 2005 (JP) ................................ 2005-028806

(51) Int. Cl.
*C09K 19/00* (2006.01)
(52) U.S. Cl. .............. 428/1.5; 428/1.2; 349/75; 349/76; 359/489.01; 359/489.02; 359/489.07; 427/163.1; 427/496
(58) Field of Classification Search .............. 428/1.1, 428/1.3, 1.5; 349/75, 76; 359/489.01, 489.02, 359/489.07; 427/496, 163.1
See application file for complete search history.

(56) References Cited

U.S. PATENT DOCUMENTS
6,380,996 B1    4/2002  Yokoyama et al.
(Continued)

FOREIGN PATENT DOCUMENTS
EP    1 341 008 A1    9/2003
(Continued)

OTHER PUBLICATIONS

Broer et al., "Three Dimensionally Ordered Polymer Networks with a Heliocoidal Structure," Macromolecules 1990, 23, 2474-2477.*
CRC Handbook or Chemistry and Physics, 90th Ed. Internet version 2010, http://www.hbcpnetbase.com/ . p. 13-6 to 13-12.*
PCT/ISA/210 for PCT/JP2005/024259 dated Apr. 11, 2006.
PCT/ISA/237 for PCT/JP2005/024259 dated Apr. 11, 2006.

(Continued)

*Primary Examiner* — Gerard Higgins
(74) *Attorney, Agent, or Firm* — Buchanan Ingersoll & Rooney PC

(57) ABSTRACT

A novel optical compensation sheet is disclosed. The sheet comprising a polymer layer formed by coating and, drying a solution comprising a polymer compound and a solvent composition comprising 20% by weight or more of water; and an optically anisotropic layer formed on the surface of the polymer layer by hardening a liquid crystal layer comprising at least one liquid-crystalline compound under irradiation of ionizing radiation at a film surface temperature from 70 to 160° C.; wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis).

11 Claims, 5 Drawing Sheets

U.S. PATENT DOCUMENTS

| | | |
|---|---|---|
| 6,685,998 B1 | 2/2004 | Nishikawa et al. |
| 6,937,307 B1 | 8/2005 | Ito et al. |
| 7,057,690 B2 | 6/2006 | Ito et al. |
| 2004/0052977 A1* | 3/2004 | Ogawa et al. .................. 428/1.1 |
| 2004/0151846 A1 | 8/2004 | Aminaka et al. |
| 2005/0219447 A1 | 10/2005 | Slaney et al. |

FOREIGN PATENT DOCUMENTS

| | | |
|---|---|---|
| JP | 2-176625 A | 7/1990 |
| JP | 11-268415 A | 10/1999 |
| JP | 2000-094729 A | 4/2000 |
| JP | 2000-169753 A | 6/2000 |
| JP | 2000-304930 A | 11/2000 |
| JP | 2001-004824 A | 1/2001 |
| JP | 2002-6138 A | 1/2002 |
| JP | 2004-043710 A | 2/2004 |
| JP | 2004-078171 A | 3/2004 |
| JP | 2004-272202 A | 9/2004 |
| JP | 2004-287417 A | 10/2004 |
| JP | 2004-309598 A | 11/2004 |
| WO | WO 0120393 A1 * | 3/2001 |
| WO | 03/054111 A1 | 7/2003 |

OTHER PUBLICATIONS

K. Ohmuro et al., 33.3: Development of Super-High-Image-Quality Vertical-Alignment-Mode LCD, ISSN0097-0966X/97/2801-0845, SID DIGEST, 1997, pp. 845-848.

Kyeong Hyeon Kim et al., 40.4: Invited Paper: Advance of PVA Technology for Multi-media Applications, SID 03 DIGEST, ISSN/003-0966X/03/3402-1208, pp. 1208-1211.

PCT/ISA/237 for PCT/JP2005/024259 dated Jul. 3, 2007.

Official Action (Notification of Reason(s) for Refusal), issued Aug. 10, 2010 in corresponding Japanese Application No. 2005-028806, and an English translation thereof.

Official Action (Decision of Refusal), issued Aug. 10, 2010 in corresponding Japanese Application No. 2004-378943, and an English translation thereof.

Office Action (Decision of Refusal, Decision to Dismiss the Amendment) from Japanese Patent Office issued in corresponding Japanese Patent Application No. 2005-028806 dated Feb. 1, 2011, with an English translation thereof.

Japanese Office Action cited in corresponding Application No. 2004-378943 dated Dec. 8, 2009.

* cited by examiner

OPTICAL COMPENSATION SHEET, PROCESS FOR PRODUCING THE SAME, AND POLARIZING PLATE AND LIQUID CRYSTAL DISPLAY DEVICE USING THE SAME

TECHNICAL FIELD

The present invention relates to an optical compensation sheet, a process for producing the same, and a liquid crystal display device using the same, and more specifically to an optical compensation sheet preferably used for vertical-aligned (VA) mode liquid crystal display device and a process for producing the same, and a vertical-aligned (VA) mode liquid crystal display device improved in the viewing angle characteristics.

RELATED ART

A CRT (cathode ray tube) has been mainly employed in various display devices used for office automation (OA) equipment such as a word processor, a notebook-sized personal computer and a personal computer monitor, mobile phone terminal and television set. A liquid crystal display device has advantages in its thinness, lightweight and low power consumption, and, in recent years, it has more widely been used in the place of a CRT. A liquid crystal display device usually comprises a liquid crystal cell and polarizing plates. The polarizing plate usually has protective films and a polarizing film, and is obtained typically by dying the polarizing film composed of a polyvinyl alcohol film with iodine, stretching, and being stacked on both surfaces thereof with the protective films. A transmissive liquid crystal display device usually comprises polarizing plates on both sides of the liquid crystal cell, and occasionally comprises one or more optical compensation films. A reflective liquid crystal display device usually comprises a reflector plate, the liquid crystal cell, one or more optical compensation films, and a polarizing plate in this order. The liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) and VA (vertically aligned) ECB (electrically controlled birefringence), and .STN (super twisted nematic). Color and contrast displayable by the conventional liquid crystal display device, however, vary depending on the angle of view when the LCD is watched. Therefore, it cannot be said that the viewing angle characteristics of the liquid crystal display device have exceeded performance of the CRT.

In recent years, there has been proposed a vertical-aligned nematic liquid crystal display device (referred to as "VA mode", hereinafter) as a mode of LCD capable of improving the viewing angle characteristics, in which nematic liquid-crystalline molecules having a negative dielectric anisotropy are used, wherein the liquid-crystalline molecules are oriented so as to direct the long axes thereof nearly vertical to the substrate under no applied voltage, and are driven by thin-film transistors (see Japanese Laid-Open Patent Publication "Tokkaihei" No. 2-176625). The VA mode is not only excellent in the display characteristics in the front view similarly to the TN mode, but also can exhibit wider viewing angle characteristics by using a retardation film for viewing angle compensation. It has also been known that the VA mode is successful in obtaining more wider viewing angle characteristics by using a negative uniaxial retardation plate (negative c-plate) having the optical axis in the direction normal to the film surface, and in obtaining further more wider viewing angle characteristics by adopting, to the LCD, a positive uniaxially oriented retardation film (positive a-plate) having a positive refractive index anisotropy expressed by an in-plane retardation of 50 nm (see SID 97 DIGEST, p. 845-848).

Use of an increased number of retardation films, however, results in increase in the production cost. Such bonding of a large number of films may not only tend to lower the yield ratio, but also tend to lower the display quality due to misalignment of the angle of bonding. Use of a plurality of films results in increased in the thickness, and may raise a disadvantage in thinning of the display device.

A positive a-plate is generally formed of a stretched film. A stretched film produced by a simple longitudinal-stretching technique usually has a slow axis parallel to the moving direction (MD) of the film. Thus, a-plate formed of such a stretched film has a slow axis parallel to the moving direction (MD) of the film. In the viewing angle compensation of the VA mode, it is however necessary to make the slow axis of the a-plate cross normal to the MD to which the absorption axis of the polarizer plate is aligned, and this consequently makes it impossible to bond the films in a roll-to-roll manner, and thereby considerably increases the cost. One possible solution may be using so-called transversely stretched film produced by stretching the film in the direction (TD) normal to MD, but the transversely stretched film tends to cause distortion of the slow axis called "bowing", lowers the yield ratio, and thereby raises the cost. There is also concern that a pressure-sensitive adhesion layer used for stacking the stretched film may shrink under varied temperature or humidity, and may result in failures such as separation of the films and warping. As a solution for improving these problems, there is known a method of producing the a-plate by coating a rod-like liquid crystal (see Japanese Laid-Open Patent Publication "Tokkai" No. 2000-304930).

In more recent years, there has been proposed a method of using a biaxial retardation plate in place of combination of the c-plate and the a-plate (SID 2003 DIGEST, p. 1208 to 1211). Use of the biaxial retardation plate is advantageous in improving not only the viewing-angle-dependent contrast but also the color tone, but it is difficult for biaxial stretching, generally adopted to manufacture of the biaxial retardation plate, to ensure uniform axial control over the entire region of the film, similarly to transverse stretching, and this is causative of poor yield ratio and increased cost.

There has been proposed methods of manufacturing biaxial retardation plate, without relying upon stretching, typically by irradiating polarized light to a particular cholesteric liquid crystal (WO03/054111 A13), and by irradiating polarized light to a particular discotic liquid crystal (Japanese Laid-Open Patent Publication "Tokkai" No. 2002-6138). These methods can overcome various problems ascribable to the stretching.

It is necessary, for the manufacture of retardation plate according to a process comprising a coating step of coating a liquid crystal material, to provide an alignment layer just thereunder in order to align the liquid crystal material. However, the alignment layer generally used, such as those formed of polyvinyl alcohol, polyimide and so forth, or even such as those having a reactive group in the side chain thereof, have failed in obtaining a desirable level of adhesiveness with the layer formed of the liquid crystal.

Another known problem is that the retardation plate produced according to a process comprising the coating step can achieve only a poorer level of front contrast as compared with the retardation plate produced by a process not comprising the coating step.

SUMMARY OF THE INVENTION

It is therefore an object of a first embodiment of the present invention to provide a coating type optical compensation sheet capable of optically compensating a liquid crystal cell in an exact manner, and is excellent in the adhesiveness between a layer formed of a liquid-crystalline composition and an alignment layer; a polarizer plate using the same; and a liquid crystal display device. In particular, the object is to provide those employed in VA-mode liquid crystal display device.

It is an object of a second embodiment of the present invention to provide a coating-type optical compensation sheet capable of optically compensating the liquid crystal cell in an exact manner, and is particularly contributive to improvement in the optical characteristics, represented by front contrast, of VA-mode liquid crystal display device, and a polarizer plate using the same. Still another object is to provide a liquid crystal display device, in particular VA-mode liquid crystal display device, improved in the front contrast.

The first embodiment of the present invention relates to an optical compensation sheet comprising a transparent substrate, a polymer layer formed on the transparent substrate by coating and drying a solution comprising a polymer compound and a solvent composition comprising 20% by weight or more of water; and an optically anisotropic layer formed on the surface of the polymer layer by hardening a liquid crystal layer comprising at least one liquid-crystalline compound under irradiation of ionizing radiation at a film surface temperature from 70 to 160° C.;

wherein a frontal retardation (Re) value of the optically anisotropic layer is not zero, and the optically anisotropic layer gives substantially equal retardation values for light of a wavelength $\lambda$ nm coming respectively in a direction rotated by +40° and in a direction rotated by −40° with respect to a normal direction of a layer plane using an in-plane slow axis as a tilt axis (a rotation axis).

As embodiments of the present invention, the optical compensation sheet of the first embodiment, wherein the liquid-crystalline compound is a polymerizable liquid-crystalline compound having at least one reactive group, and the optically anisotropic layer is a layer formed by carrying out reaction of the reactive group under heating and/or irradiation of ionizing radiation thereby hardening the liquid crystal layer; the optical compensation sheet of the first embodiment, wherein the film surface temperature of the liquid crystal layer, when being irradiated with ionizing radiation, is higher than the glass transition temperature of the polymer compound; the optical compensation sheet of the first embodiment, wherein the film surface temperature of the liquid crystal layer, when being irradiated with ionizing radiation, is higher by 1 to 30° C. than the glass transition temperature of the polymer compound; the optical compensation sheet of the first embodiment, wherein the solution comprises at least one polymer having a polymerizable group in side chain thereof; the optical compensation sheet of the first embodiment, wherein the liquid-crystalline compound exhibits a cholesteric liquid crystallinity; and the optical compensation sheet of the first embodiment, wherein the liquid-crystalline compound is a polymerizable liquid-crystalline compound having at least one ethylenic unsaturated group, and the optically anisotropic layer is a layer formed by carrying out reaction of the at least one ethylenic unsaturated group under irradiation of polarized ultraviolet light thereby hardening the liquid crystal layer; are provided.

The second embodiment of the present invention relates to an optical compensation sheet comprising an optically anisotropic layer, formed of a cholesteric liquid-crystalline composition, having a thickness of 500 nm or more and 5 μm or less and having a cholesteric pitch of 120 nm or smaller, wherein the cholesteric liquid-crystalline composition comprises at least one polymerizable cholesteric liquid-crystalline compound having at least one reactive group, and the optically anisotropic layer is formed by carrying out reaction of the reactive group under heating and/or irradiation of ionizing radiation thereby hardening the cholesteric liquid-crystalline composition.

In another aspect, the second embodiment of the present invention relates to an optical compensation sheet comprising a transparent substrate, a polymer layer formed thereon, and, on the surface of the polymer layer, an optically anisotropic layer formed of a polymerized cholesteric liquid-crystalline composition, having a thickness of 500 nm or more and 5 μm or less and a cholesteric pitch of 120 nm or smaller, wherein a frontal retardation (Re) value of the optically anisotropic layer is zero, and the optically anisotropic layer gives not zero retardation value for light of a wavelength $\lambda$ nm coming in a direction rotated by +40° with respect to a normal direction of a layer plane using an in-plane slow axis as a tilt axis (a rotation axis).

In another aspect, the second embodiment of the present invention relates to an optical compensation sheet comprising a transparent substrate, a polymer layer formed thereon, and, on the surface of the polymer layer, an optically anisotropic layer formed of a polymerized liquid-crystalline composition, having a thickness of 500 nm or more and 5 μm or less and a cholesteric pitch of 120 nm or smaller, wherein a frontal retardation (Re) value of the optically anisotropic layer is not zero, and the optically anisotropic layer gives substantially equal retardation values for light of a wavelength $\lambda$ nm coming respectively in a direction rotated by +40° and in a direction rotated by −40° with respect to a normal direction of a layer plane using an in-plane slow axis as a tilt axis (a rotation axis).

As embodiments of the present invention, the optical compensation sheet of the second embodiment, wherein the cholesteric pitch of the optically anisotropic layer is 100 nm or smaller; the optical compensation sheet of the second embodiment, wherein the optically anisotropic layer is formed by carrying out hardening the composition under irradiation of polarized ultraviolet light; and the optical compensation sheet of the second embodiment, having a frontal retardation of 0 to 70 nm and giving a retardation of 30 to 150 nm when light of a wavelength $\lambda$ nm coming in a direction rotated by +40° with respect to a normal direction of a layer plane using an in-plane slow axis as a tilt axis (a rotation axis); are provided.

The optical compensation sheet of the first or second embodiment may comprise the transparent substrate comprising at least one polymer selected from cellulose based polymers and cycloolefin based polymers.

The optical compensation sheet of the first or second embodiment may be used for optical compensation of a liquid crystal cell comprising a pair of substrate disposed facing each other and a liquid crystal layer held between said pair of substrates, comprising a liquid crystal material, liquid-crystalline molecules of said liquid crystal material being aligned substantially normal to the surfaces of said pair of substrates.

In another aspect, the present invention provides a polarizing plate comprising a polarizing film and at least one optical compensation sheet of the first or second embodiment.

In another aspect, the present invention provides a liquid crystal display comprising at least one polarizing plate of the present invention or at least one optical compensation sheet of the first or second embodiment.

The liquid crystal display may employ a VA-mode.

In another aspect, the present invention provides a process for producing an optical compensation sheet comprising:

forming, on a transparent substrate, a polymer layer by coating and drying a solution comprising a polymer compound and a solvent composition comprising 20% by weight or more of water; and forming an optically anisotropic layer by irradiating a liquid crystal layer, which comprises at least one liquid-crystalline compound, disposed on the surface of said polymer layer, with ionizing radiation at a film surface temperature of 70 to 160° C. so as to harden it, wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis).

Figure 1:
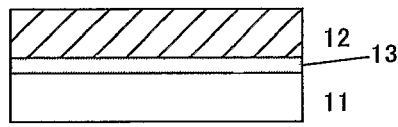
FIG. 1 is a schematic sectional view showing an exemplary optical compensation sheet of the first embodiment of the present invention.

Reference numerals shown in the drawings represent the components as follows:

| 11 | transparent substrate; |
|---|---|
| 12, 12' | optically anisotropic layer formed of a liquid-crystalline composition; |
| 13, 13' | alignment layer; |
| 21 | polarizing layer; |
| 22, 23 | protective film; |
| 24 | functional layer such as λ/4 plate, anti-reflection film and so forth; |
| 31 | cathode ray tube; |
| 32 | reflection sheet; |
| 33 | light guide plate; |
| 34 | light-controllable film such as luminance enhancing film, diffusion film and so forth; |
| 35 | liquid crystal cell; |
| 36 | lower polarizer plate; |
| 37 | upper polarizer plate; |
| 41 | polarizing layer; |
| 42 | transparent substrate; |
| 43 | alignment layer; |
| 44 | optically anisotropic layer; |
| 45 | polarizer plate protective film; |
| 46 | glass substrate for liquid crystal cell; |
| 47 | liquid crystal cell; |
| 48 | pressure-sensitive adhesive; and |
| 51 | uniaxially-stretched optical compensation sheet. |

DETAILED DESCRIPTION OF THE INVENTION

The following paragraphs will detail the present invention.

In the specification, ranges indicated with "to" mean ranges including the numerical values before and after "to" as the minimum and maximum values.

In the specification, Re(λ) and Rth(λ) of a polymer film respectively mean an in-plane retardation and a retardation in a thickness-direction at wavelength λ. The Re(λ) is measured by using KOBRA-21ADH (manufactured by Oji Scientific Instruments) for an incoming light of a wavelength λ nm in a direction normal to a film-surface. The Rth(λ) is calculated by using KOBRA-21ADH based on the Re(λ) value and plural retardation values which are measured for incoming light of a wavelength λ nm in plural directions rotated with respect to the normal direction of the film using an in-plane slow axis, which is decided by KOBRA 21ADH, as an a tilt axis (a rotation axis). A hypothetical mean refractive index and a thickness value of the film should be entered. The values of nx, ny and nz are calculated as well as Rth(λ) value by using KOBRA 21ADH. As a mean refractive index of cellulose acylate, 1.48 is entered, and the mean refractive indexes of major optical films other than cellulose acylate film are exemplified below:

cyclo-olefin polymer (1.52), polycarbonate (1.59), polymethyl methacrylate (1.49), polystyrene (1.59).

The mean refractive indexes of various materials are described in published documents such as "POLYMER HANDBOOK" (JOHN WILEY&SONS, INC) and catalogs. If the values are unknown, the values may be measured with an abbe refractometer or the like. The measurement wavelength is 545±5 nm or 590±5 nm, unless otherwise specifically noted.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of this specification means that a tolerance of less than ±5% with respect to the precise values can be allowed. It is also to be noted that the term "The Re value is not zero" in the context of this specification means that the Re value is not less than 5 nm. The measurement wavelength for refractive indexes is a visible light wavelength, unless otherwise specifically noted. It is also to be noted that the term "visible light" in the context of this specification means light of a wavelength falling within the range from 400 to 700 nm.

[Optical Compensation Sheet]

FIG. 1 is a schematic sectional view showing an exemplary optical compensation sheet according to the first embodiment of the present invention. The optical compensation sheet of the first embodiment of the present invention comprises a transparent substrate 11 and an optically anisotropic layer 12 provided thereon. Between the transparent substrate 11 and the optically anisotropic layer 12, there is disposed a polymer layer 13 which functions as an alignment layer controlling orientation of liquid-crystalline molecules in the optically anisotropic layer 12 when the optically anisotropic layer is formed. The optically anisotropic layer 12 is a layer formed by hardening a liquid crystal layer which comprises at least one liquid-crystalline compound, by irradiating ionizing radiation at a film surface temperature of 70 to 160° C. The polymer layer 13, which functions as an alignment layer of the optically anisotropic layer 12, is a polymer layer formed by coating and drying a solution comprising at least one polymer compound and a solvent composition comprising 20% by weight or more of water. The polymer layer 13 and the optically anisotropic layer 12 are excellent in the adhesiveness with each other, and even if the optical compensation sheet of the first embodiment is subjected to a cleaning treatment such as rinsing or a chemical treatment such as saponification, they are hardly to separate, and, thus, the optical compensation sheet is easy to handled. In addition, the optical characteristics of the optically anisotropic layer 12 is adjusted so that a frontal retardation (Re) value of the optically anisotropic layer is not zero, and the optically anisotropic layer gives substantially equal retardation values for light of a wavelength $\lambda$ nm coming respectively in a direction rotated by +40° and in a direction rotated by −40° with respect to a normal direction of a layer plane using an in-plane slow axis as a tilt axis (a rotation axis). And, thus, the optical compensation sheet of the first embodiment can exactly compensate the liquid crystal cell, in particular VA-mode liquid crystal cell.

Figure 2:
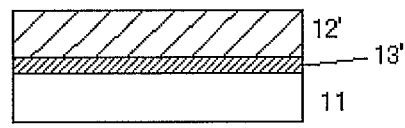
FIG. 2 is a schematic sectional view showing an exemplary optical compensation sheet of the second embodiment of the present invention.

FIG. 2 is a schematic sectional view showing an exemplary optical compensation sheet of the second embodiment of the present invention. The optical compensation sheet of the second embodiment of the present invention comprises a transparent substrate 11, and an optically anisotropic layer 12'. Between the transparent substrate 11 and the optically anisotropic layer 12', there is disposed a polymer layer 13' which functions as an alignment layer controlling orientation of liquid-crystalline molecules in the optically anisotropic layer 12' when he optically anisotropic layer 12' is formed. The optically anisotropic layer 12' is a layer formed by hardening a liquid-crystalline composition which comprises at least one liquid-crystalline compound, by irradiating ionizing radiation. The polymer layer 13', which functions as an alignment layer of the optically anisotropic layer 12', is a polymer layer formed by coating and drying a solution comprising at least one polymer compound. The optically anisotropic layer 12' is a layer formed by hardening the composition in the cholesteric phase, with a cholesteric pitch of 120 nm or less. The thickness of the optically anisotropic layer 12' is in the range from 500 nm to 5 µm, both ends inclusive. According to the second embodiment of the present invention, use of such optically anisotropic layer makes it possible to exactly compensate the liquid crystal cell, in particular VA-mode liquid crystal cell.

The optically anisotropic layer 12', adjusted in the optical characteristics so that a frontal retardation (Re) value of the optically anisotropic layer is not zero, and the optically anisotropic layer gives substantially equal retardation values for light of a wavelength $\lambda$ nm coming respectively in a direction rotated by +40° and in a direction rotated by −40° with respect to a normal direction of a layer plane using an in-plane slow axis as a tilt axis (a rotation axis), can function as a biaxial medium, and can therefore more exactly compensate the liquid crystal cell, in particular VA-mode liquid crystal cell.

It is also allowable that a frontal retardation (Re) value of the optically anisotropic layer is not zero, and the optically anisotropic layer gives not zero retardation value for light of a wavelength $\lambda$ nm coming in a direction rotated by +40° with respect to a normal direction of a layer plane using an in-plane slow axis as a tilt axis (a rotation axis). The optically anisotropic layer 12' in this case can function as a negative c-plate, and can exactly compensate the liquid crystal cell, in particular VA-mode liquid crystal cell.

[Polarizer Plate]

Figure 3:
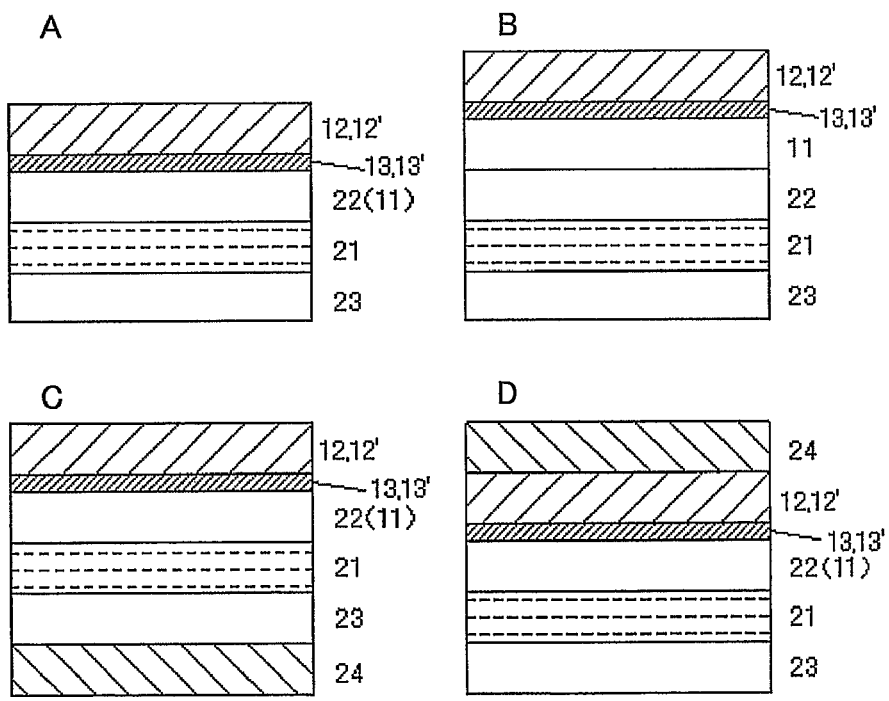
FIGS. 3A to 3D are schematic sectional views showing examples of the polarizer plate of the present invention.

FIGS. 3A to 3D are schematic sectional views showing examples of the polarizer plate having the optical compensation sheet of the first or second embodiment of the present invention ("optical compensation sheet of the present invention" will mean both of optical compensation sheets according to the first and second aspects of the present invention, hereinafter). The polarizer plate can be produced generally by dying a polarizer film formed of a polyvinyl alcohol film with iodine, stretching the film so as to obtain a polarizer film 21, and bonding on both surface thereof protective films 22 and 23. The optical compensation sheet of the present invention comprises a substrate formed of a polymer film supporting the optically anisotropic layer, so that the substrate can directly be applied to at least one of the protective films 22 and 23. The optically anisotropic layer 12 or 12' in this case may be disposed on the polarizing layer 21 side (that is, the optically anisotropic layer 12 or 12' is disposed more closer to the polarizing layer 21 than to the substrate 11), or may be disposed on the opposite side of the polarizing layer 21 (that is, the optically anisotropic layer 12 or 12' is disposed more further from the polarizing layer 21 than from the substrate 11), wherein as shown in FIG. 3A, the optically anisotropic layer 12 or 12' is preferably disposed on the opposite side of the polarizing layer 21. It is also allowable, as shown in FIG. 3B, to bond it on the outer side of one protective film 22 on the polarizing layer 21, while placing a pressure-sensitive adhesive in between.

FIGS. 3C and 3D show exemplary configurations in which the polarizer plate configured as shown in FIG. 3A comprises an additional functional layer 24 disposed thereon. FIG. 3C shows an exemplary configuration in which the additional functional layer 24 is disposed on the protective film 23 disposed opposite to the optical compensation sheet of the present invention while placing the polarizing layer 21 in between, and FIG. 3D shows an exemplary configuration in which the additional functional layer 24 is disposed on the optical compensation sheet of the present invention. There is no specific limitation on the additional functional layer, and the functional layer may be any of those imparting various characteristics, such as by $\lambda/4$ layer, anti-reflection layer and hard-coat layer. These layers may be bonded as a component of $\lambda/4$ plate, anti-reflection film or hard-coat film, typically with the aid of a pressure-sensitive adhesive, or for the case of the configuration in FIG. 3D, the additional functional layer 24 may be formed on the optical compensation sheet (optically anisotropic layer 12 or 12') of the present invention, and the resultant stack is then bonded to the polarizing layer 21. It is also allowable to bond the protective film 23 and the optical compensation sheet of the present invention, and the resultant stack is then bonded to the additional functional film such as $\lambda/4$ plate, anti-reflection film and hard-coat film.

A pair of protective films and a polarizer film, three films in total, may be bonded in a roll-to-roll manner. The roll-to-roll bonding is a preferable method not only from the viewpoint of productivity, but also because the polarizer plate is less causative of dimensional change or curling, and thereby can be imparted with an excellent mechanical stability.

[Liquid Crystal Display Device]

Figure 4:
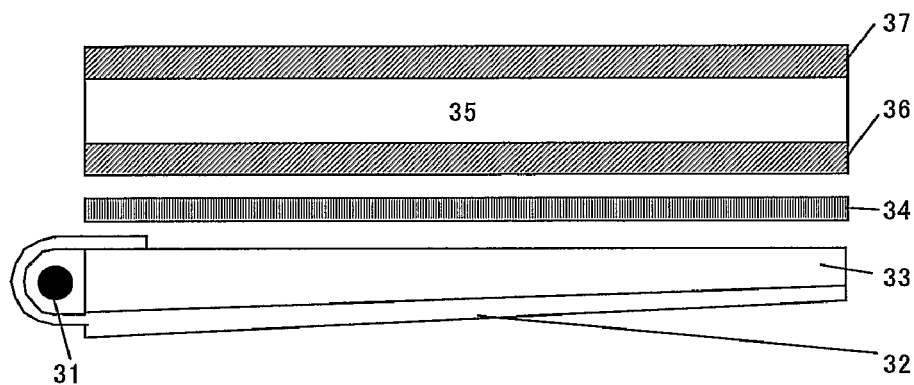
FIG. 4 is a schematic sectional view showing an exemplary liquid crystal display device of the present invention.

FIG. 4 shows an exemplary liquid crystal display device of the present invention. The liquid crystal display device comprises a liquid crystal cell 35 comprising a nematic liquid crystal layer held between an upper and lower electrode plates, and a pair of polarizer plates 36 and 37 disposed on both sides of the liquid crystal cell 35, wherein at least one of the polarizer plates adopts the polarizer plate of the present invention shown in FIGS. 3A to 3D. For the case where the polarizer plate of the present invention is used, the optically anisotropic layer is disposed between the polarizing layer and the electrode plate of the liquid crystal cell. Nematic liquid crystal is controlled to have a predetermined orientation state, with the aid of an alignment layer provided on the electrode substrate and rubbing of the surface thereof, or by providing a structure such as ribs.

The liquid crystal cell held between the polarizer plates may have, on the lower side thereof, one or more light-controllable film 34 such as luminance enhancing film, diffusion film and so forth. Further on the lower side of the light-controllable film, a reflective plate 32 which irradiates light from a cold cathode ray tube 31 back to the front, and a light guide plate 33 are provided. Recent trends include use of a straight-behind-type back light having several cold cathode ray tubes arranged under the liquid crystal cell, an LED back light using LED as a light source, and a back light allowing surface emission using organic or inorganic EL element, in place of using such back light unit composed of the cold cathode ray tube and the light guide plate, wherein the optical film of the present invention is effective with any types of back light.

Although not shown in the drawings, it is all enough for reflection-type liquid crystal display device to have only one polarizer film disposed on the observer's side, wherein the reflective film is disposed on the back surface of the liquid crystal cell, or on the inner surface of the lower substrate of the liquid crystal cell. Of course, it is also allowable to dispose a front light using the above-described light source on the observer's side of the liquid crystal cell. It is still also allowable to compose the display device as of semi-transparent type, in which a transmissive portion and a reflective portion are provided in a single pixel.

Next, materials, processes and so forth used for producing the optical compensation sheet of the present invention will be described in detail.

The optical compensation sheet of the present invention comprises a transparent substrate, the polymer layer and the optically anisotropic layer, wherein the optically anisotropic layer contributes to improvement of the contrast-ensuring viewing angle of the liquid crystal display device, and canceling coloring of image on the liquid crystal display device. The optical compensation sheet of the present invention can reduce the number of constituents composing the liquid crystal display, by allowing the substrate for supporting the optically anisotropic layer to function also as the protective film of the polarizer plate, or by allowing the optically anisotropic layer to function also as the protective film of the polarizer plate. Adoption of this embodiment also contributes to thinning of the liquid crystal display device. Next paragraphs will detail materials and processes used for production, and so forth, with respect to this embodiment, without limiting the present invention. Other embodiment can be produced referring to the description below, and publicly-known methods. It is to be understood that the present invention is by no means limited to the embodiment of the optical compensation sheet described below.

The optical compensation sheet, comprising an optically-uniaxial or biaxial transparent substrate formed of a polymer film and, on the substrate, an optically anisotropic layer, can distinctively improve the optical characteristics of a liquid crystal display device.

[Optically Anisotropic Layer Formed of Liquid-Crystalline Composition]

As described in the above, in the present invention, the optically anisotropic layer formed by hardening a liquid crystal layer which comprises at least one liquid-crystalline compound is contributive to optical compensation of the liquid crystal cell. Not only an embodiment in which a sufficient level of optical compensation function is owned by the optically anisotropic layer alone, but also an embodiment in which a sufficient level of optical compensation function is satisfied based on combination with any other layer (substrate supporting the optically anisotropic layer, for example) is allowable. In the optical compensation sheet of the present invention, the optically anisotropic layer is formed of a composition comprising at least one liquid-crystalline molecule. The liquid-crystalline molecule can generally be classified by geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be adoptable in the first embodiment of the present invention, wherein it is preferable to use the rod-like liquid-crystalline molecule or the discotic liquid-crystalline molecule. It is also allowable to use a mixture of two or more rod-like liquid-crystalline molecule, a mixture of two or more discotic liquid-crystalline molecule, or a mixture of the rod-like liquid-crystalline molecule and the discotic liquid-crystalline molecule. It is more preferable that the optically anisotropic layer is formed using a composition comprising the rod-like liquid-crystalline molecule or the discotic liquid-crystalline molecule, having a reactive group, because such compound can reduce temperature- and moisture-dependent changes, and it is still further preferable that at least one compound in the mixture has two or more reactive group in a single liquid-crystalline molecule. The liquid-crystalline molecule may be a mixture of two or more compounds, wherein it is preferable that at least one of the compounds has two or more reactive groups. The thickness of the optically anisotropic layer is preferably 0.1 to 20 µm, and more preferably 0.5 to 10 µm.

The optical compensation sheet of the second embodiment of the present invention comprises an optically anisotropic layer formed from a cholesteric liquid-crystalline composition. The cholesteric pitch of the optically anisotropic layer is 120 nm or less, and the thickness of the optically anisotropic layer is 500 nm or more and 5 µm or less. The composition preferably comprises at least one cholesteric liquid-crystalline compound, and more preferably comprises a polymerizable cholesteric liquid-crystalline compound having at least one polymerizable group, so that the layer can be hardened by polymerization. It is all enough for the composition that it can form the cholesteric phase as a whole, so that it is not essential that the layer contains any cholesteric liquid-crystalline compound. In this case, any additives other than the liquid crystal, including polymerization initiator and chelating agent, are contributive to formation of the cholesteric phase. It is also not essential for the liquid-crystalline molecule to have the polymerizable group, and instead the chiral agent or any other additives may have the polymerizable group, and it is further allowable to use a crosslinking agent having two or more polymerizable group in a single molecule. The second embodiment of the present invention may adopt any kinds of liquid-crystalline molecule, wherein it is preferable to use rod-like liquid-crystalline molecule.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be applicable.

High-molecular-weight liquid-crystalline compounds may be obtained by polymerizing low-molecular-weight liquid-crystalline compounds having at least one polymerizable group. Among such low-molecular-weight liquid-crystalline compounds, liquid-crystalline compounds represented by a formula (I) are preferred.

$Q^1$-$L^1$-$A^1$-$L^3$-M-$L^4$-$A^2$-$L^2$-$Q^2$     Formula (I)

In the formula, $Q^1$ and $Q^2$ respectively represent a polymerizable group. $L^1$, $L^2$, $L^3$ and $L^4$ respectively represent a single bond or a divalent linking group, and it is preferred that at least one of $L^3$ and $L^4$ represents —O—CO—O—. $A^1$ and $A^2$ respectively represent a $C_{2-20}$ spacer group. M represents a mesogen group.

In formula (I), $Q^1$ and $Q^2$ respectively represent a polymerizable group. The polymerization reaction of the polymerizable group is preferably addition polymerization (including ring opening polymerization) or condensation polymerization. In other words, the polymerizable group is preferably a functional group capable of addition polymerization reaction or condensation polymerization reaction. Examples of polymerizable groups are shown below.

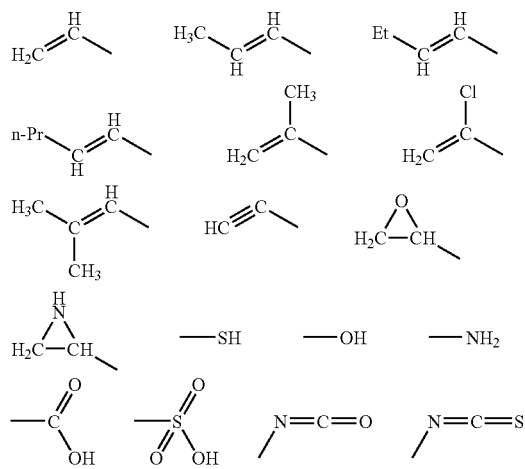

$L^1$, $L^2$, $L^3$ and $L^4$ independently represent a divalent linking group, and preferably represent a divalent linking group selected from the group consisting of —O—, —S—, —CO—, —$NR^2$—, —CO—O—, —O—CO—O—, —CO—$NR^2$—, —$NR^2$—CO—, —O—CO—, —O—CO—$NR^2$—, —$NR^2$—CO—O— and —$NR^2$—CO—$NR^2$—. $R^{12}$ represents a $C_{1-7}$ alkyl group or a hydrogen atom. It is preferred that at least one of $L^1$ and $L^4$ represents —O—CO—O— (carbonate group). It is preferred that $Q^1$-$L^1$- and $Q^2$-$L^2$- are respectively $CH_2$=CH—CO—O—, $CH_2$=C($CH_3$)—CO—O— or $CH_2$=C(Cl)—CO—O—CO—O—; and it is more preferred they are respectively $CH_2$=CH—CO—O—.

In the formula, $A^1$ and $A^2$ preferably represent a $C_{2-20}$ spacer group. It is more preferred that they respectively represent $C_{2-12}$ aliphatic group, and much more preferred that they respectively represent a $C_{2-12}$ alkylene group. The spacer group is preferably selected from chain groups and may contain at least one unadjacent oxygen or sulfur atom. And the spacer group may have at least one substituent such as a halogen atom (fluorine, chlorine or bromine atom), cyano, methyl and ethyl.

Examples of the mesogen represented by M include any known mesogen groups. The mesogen groups represented by a formula (II) are preferred.

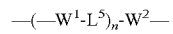

—(—$W^1$-$L^5$)$_n$-$W^2$—     Formula (II)

In the formula, $W^1$ and $W^2$ respectively represent a divalent cyclic aliphatic group or a divalent hetero-cyclic group; and $L^5$ represents a single bond or a linking group. Examples of the linking group represented by $L^5$ include those exemplified as examples of $L^1$ to $L^4$ in the formula (I) and —$CH_2$—O— and —O—$CH_2$—. In the formula, n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. 1,4-cyclohexanediyl has two stereoisomers, cis-trans isomers, and the trans isomer is preferred. $W^1$ and $W^2$ may respectively have at least one substituent. Examples the substituent include a halogen atom such as a fluorine, chlorine, bromine or iodine atom; cyano; a $C_{1-10}$ alkyl group such as methyl, ethyl and propyl; a $C_{1-10}$ alkoxy group such as methoxy and ethoxy; a $C_{1-10}$ acyl group such as formyl and acetyl; a $C_{2-10}$ alkoxycarbonyl group such as methoxy carbonyl and ethoxy carbonyl; a $C_{2-10}$ acyloxy group such as acetyloxy and propionyloxy; nitro, trifluoromethyl and difluoromethyl.

Preferred examples of the basic skeleton of the mesogen group represented by the formula (II) include, but not to be limited to, these described below. And the examples may have at least one substituent selected from the above.

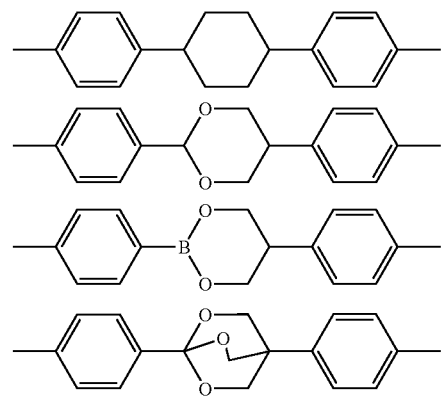

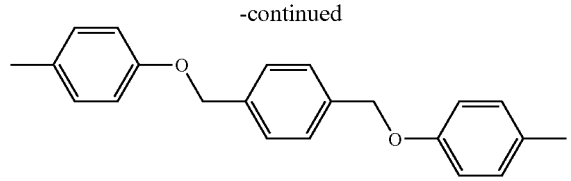
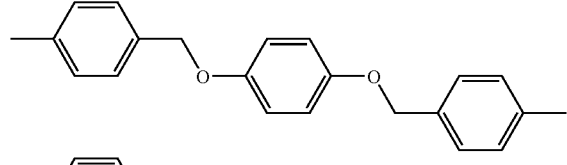
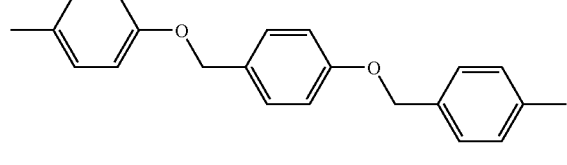
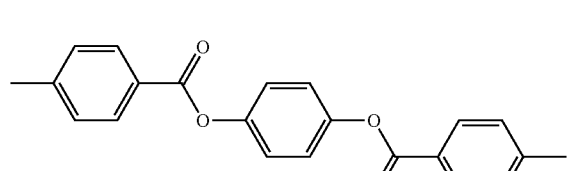
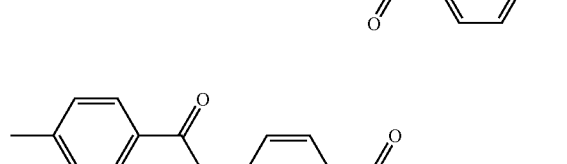
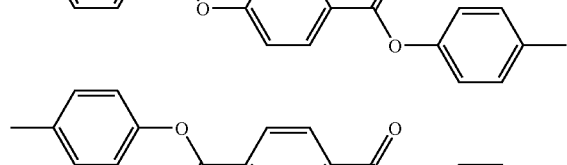
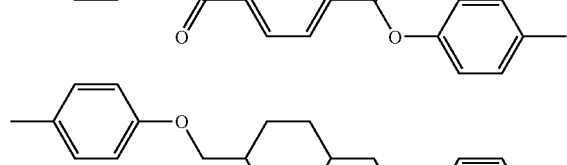
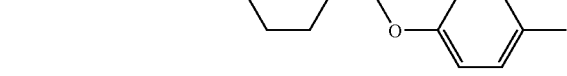
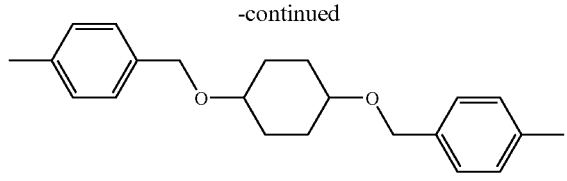
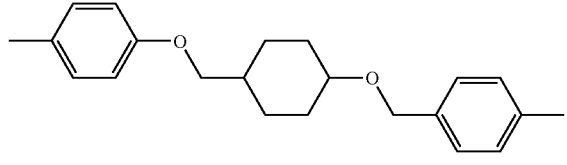
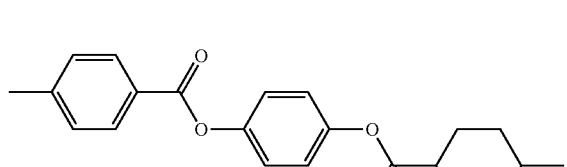
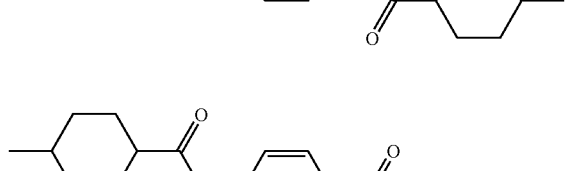
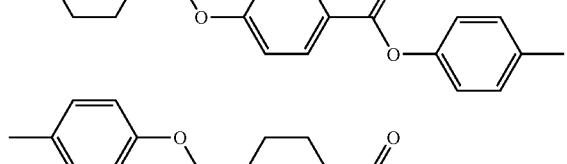
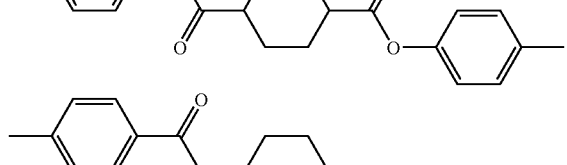
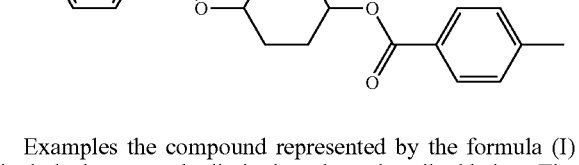
Examples the compound represented by the formula (I) include, but not to be limited to, these described below. The compounds represented by the formula (I) may be prepared according to a method described in a gazette of Tokkohyo No. hei 11-513019.
I-1
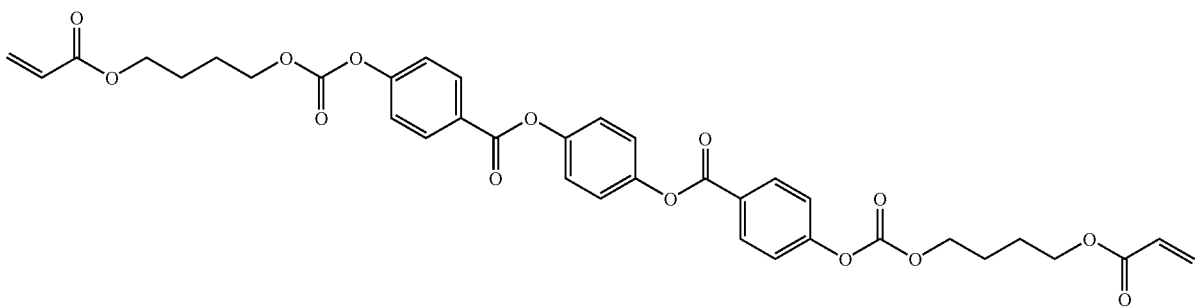

I-2
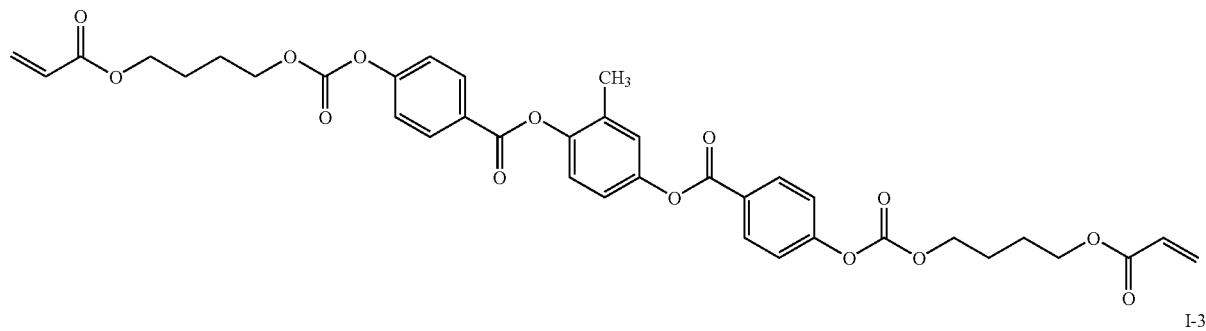
I-3
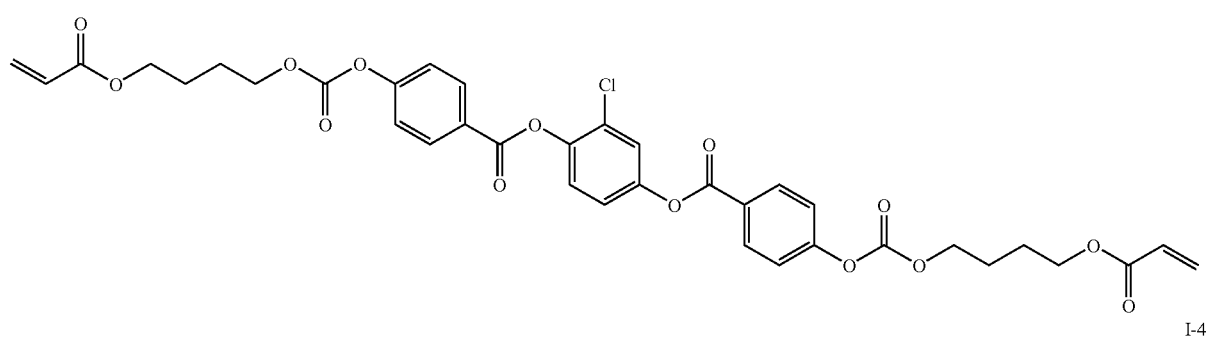
I-4
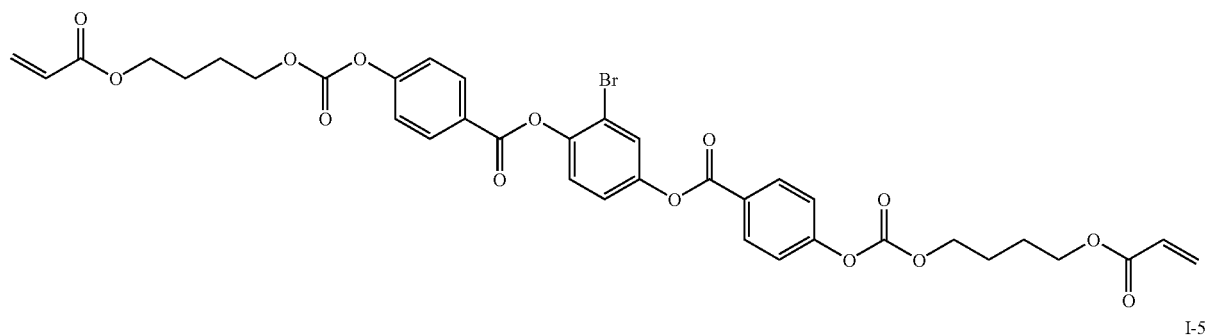
I-5
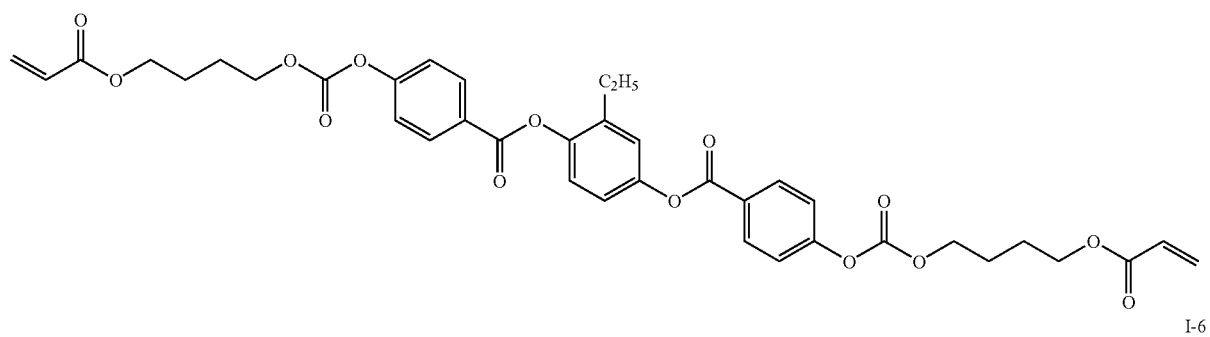
I-6
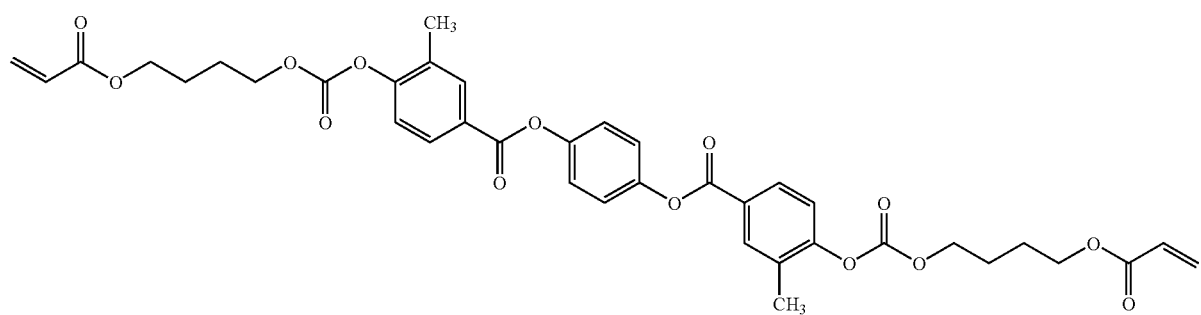

-continued
I-7
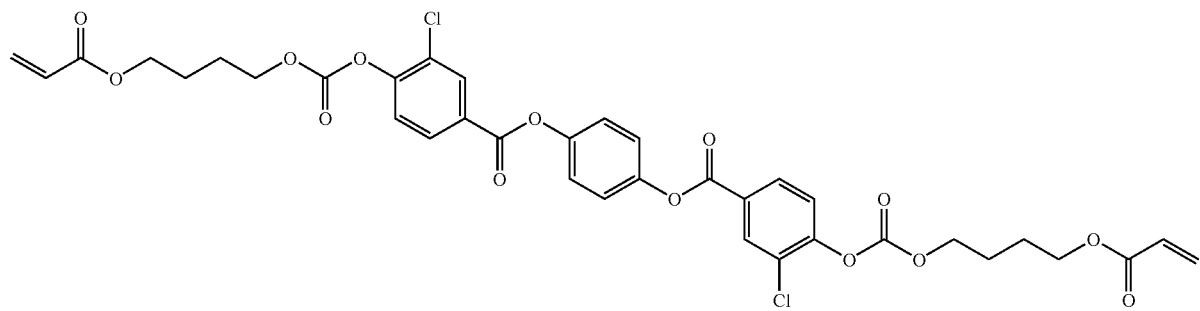
I-8
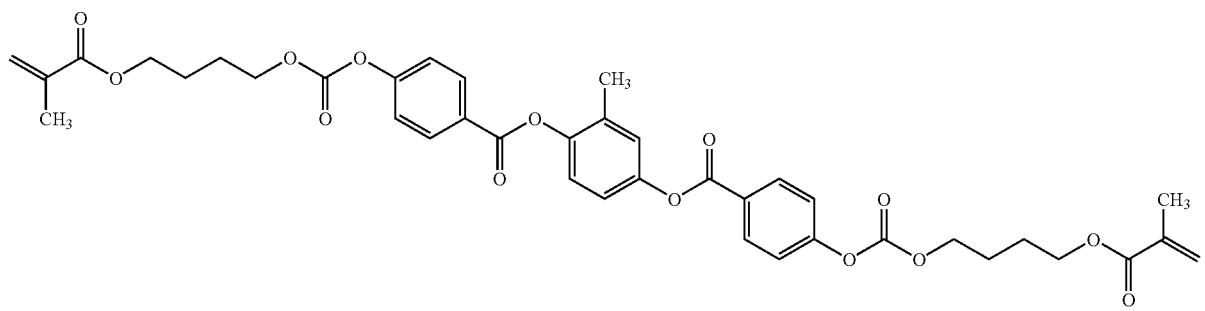
I-9
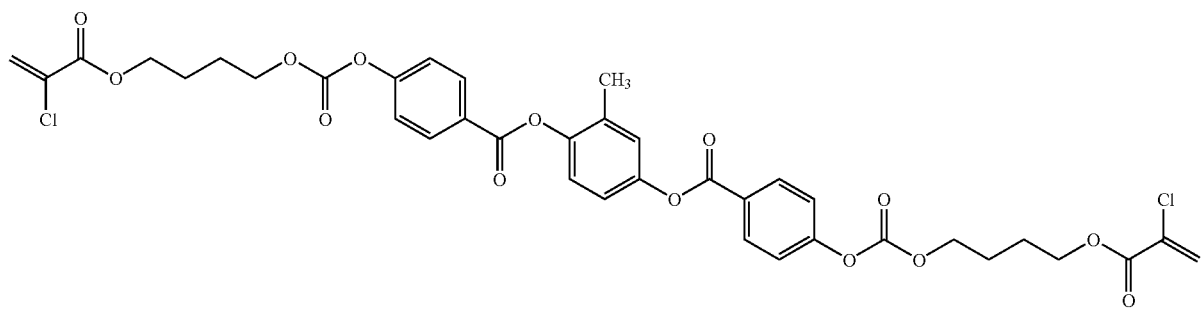
I-10
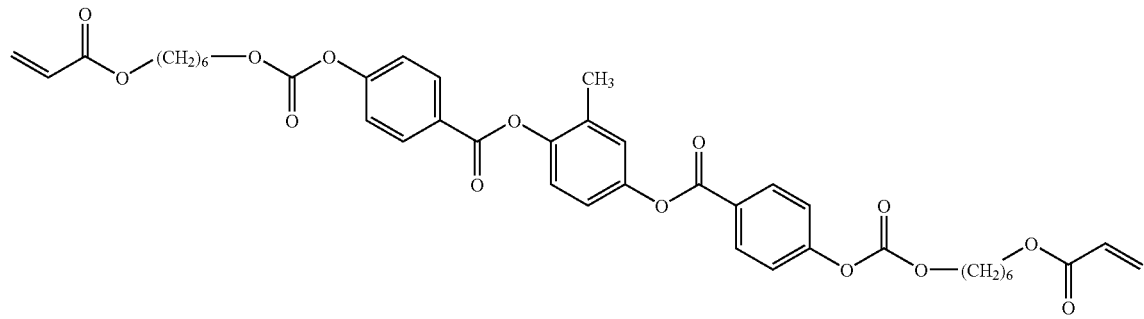

I-11
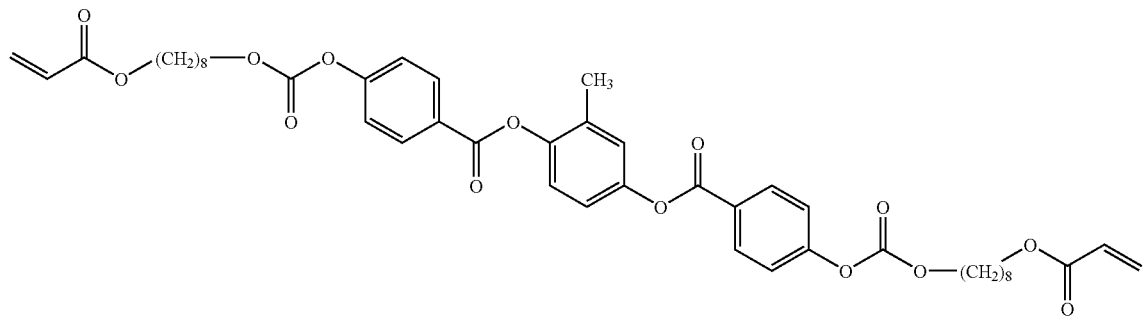
I-12
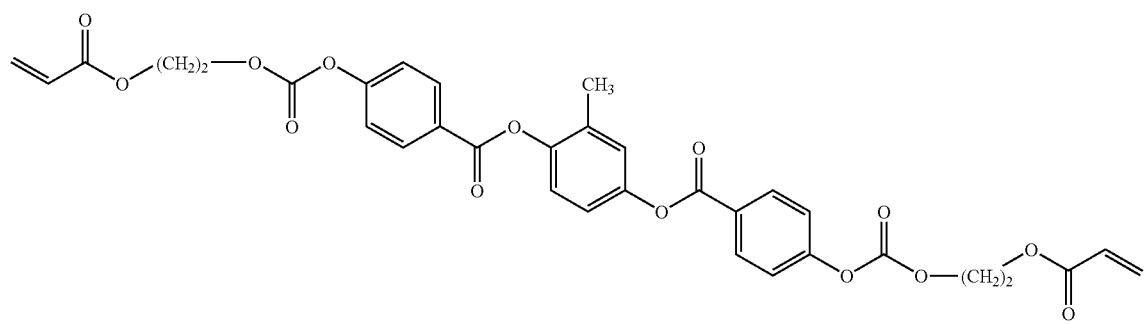
I-13
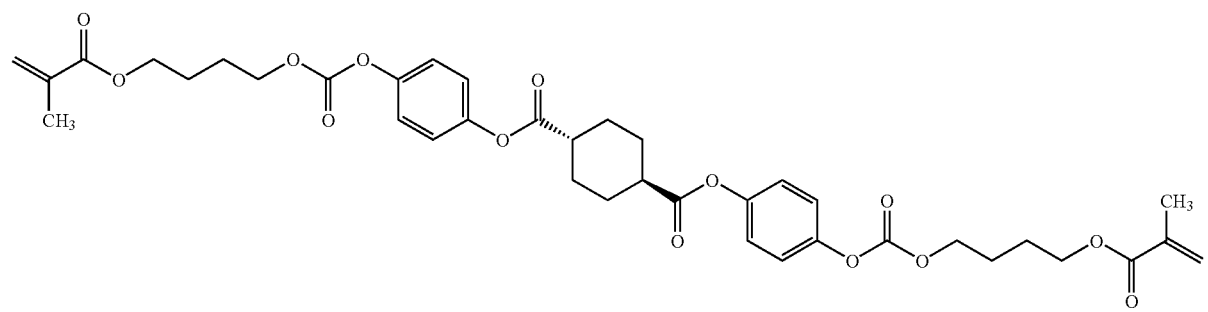
I-14
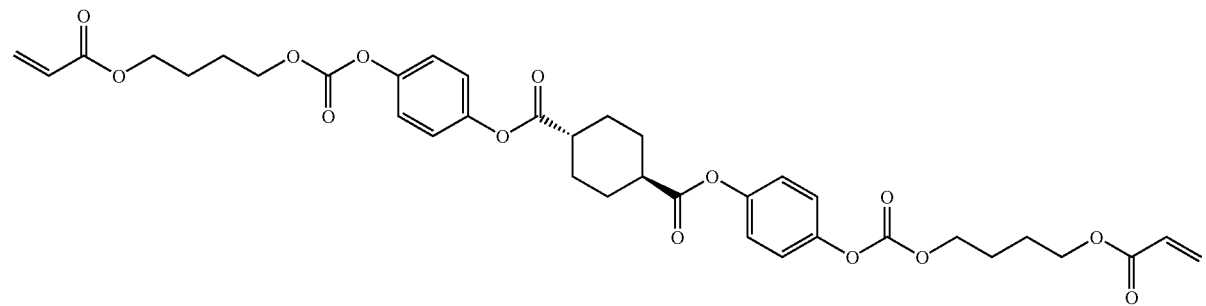

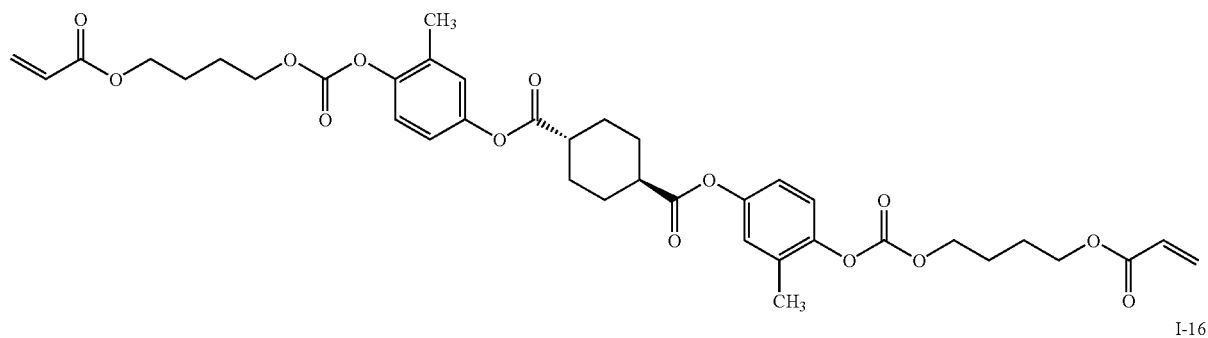
I-15
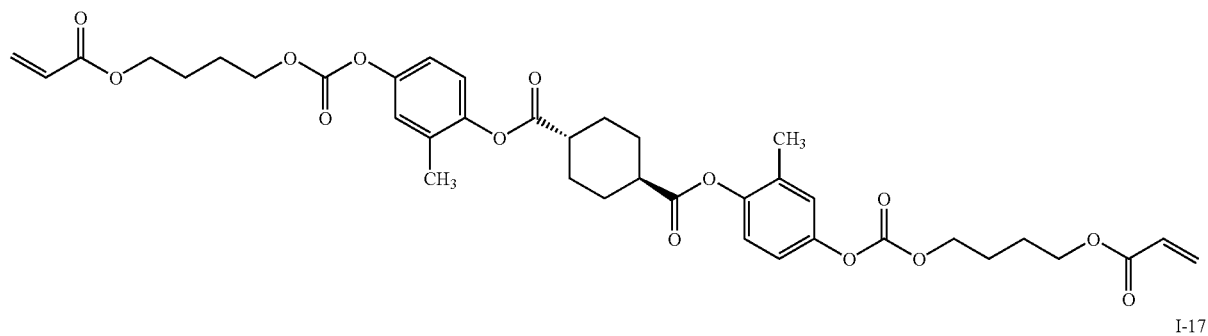
I-16
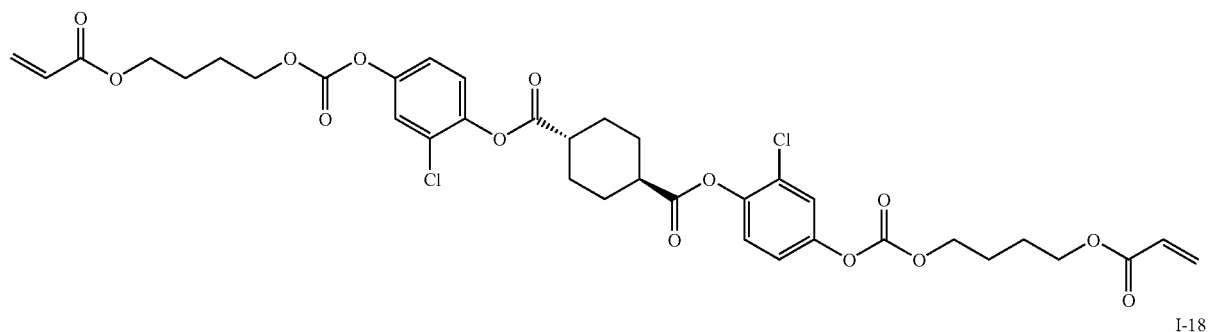
I-17
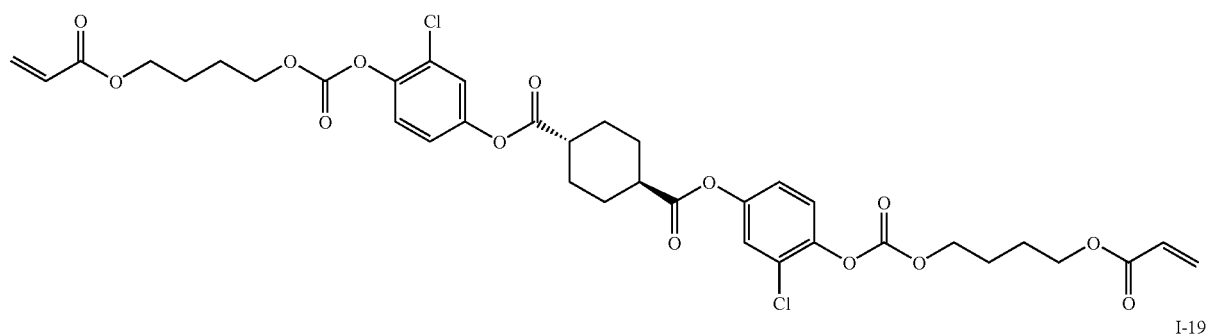
I-18
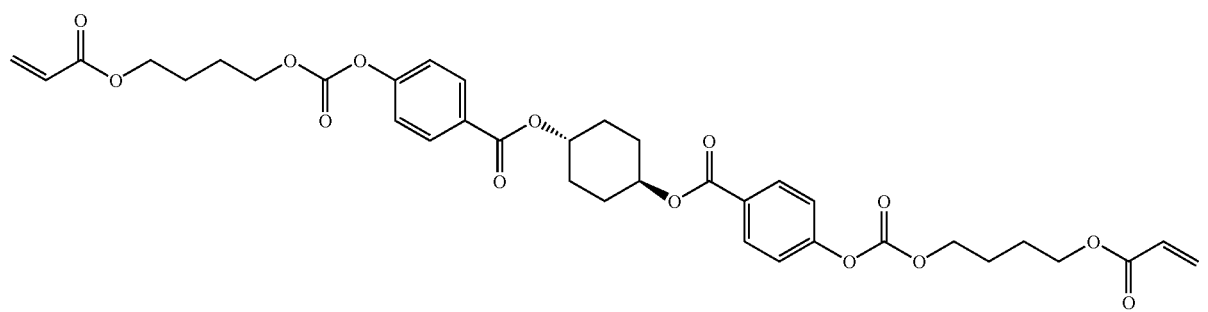
I-19

I-20

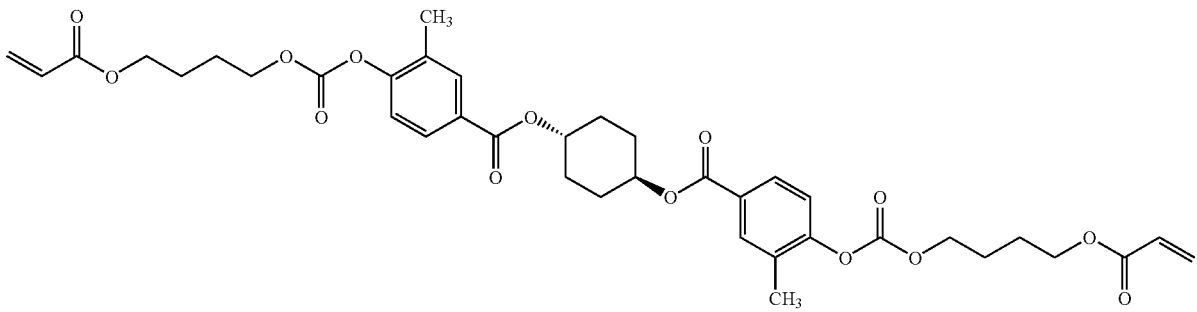

I-21

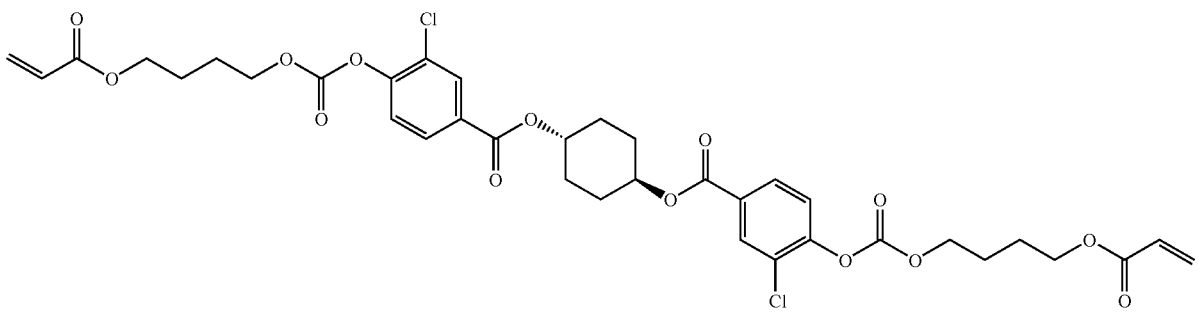

As described above, according to the first embodiment of the present invention, discotic liquid-crystalline compounds are also preferably used. Examples of the discotic liquid-crystalline compound, which can be used in the first embodiment, are described in various documents, and include benzene derivatives described in C Destrade et al., Mol. Cryst., Vol. 171, p. 111 (1981); torxene derivatives described in C. Destrade et al., Mol. Cryst., Vol. 122, p. 141 (1985) and Physics Lett., A, Vol. 78, p. 82 (1990); cyclohexane derivatives described in B. Kohne et al., Angew. Chem., Vol. 96, p. 70 (1984); and azacrown-base or phenylacetylene-base macrocycles described in J. M. Lehn, J. Chem. Commun., p. 1794 (1985) and in J. Zhang et al., J. Am. Chem. Soc., Vol. 116, p. 2655 (1994). Polymerization of a discotic liquid-crystalline compound is described in Japanese Laid-Open Patent Publication (Tokkai hei) No. 8-27284.

In order to fix the discotic liquid-crystalline compounds through polymerization, it is necessary to bind a discotic core of the discotic liquid-crystalline compound with polymerizable groups as substituent groups. Direct bonding of the polymerizable groups to the discotic core, however, makes it difficult to keep a desired orientation state during the polymerization reaction. A coupling group is therefore introduced between the discotic core and each of the polymerizable groups. The discotic liquid-crystalline compounds having the polymerizable groups are, therefore, preferably such as those expressed by the formula (III) below:

 Formula (III)

In the formula, D represents a discotic core, L represents a divalent linking group, P represents a polymerizable group, and n is an integer from 4 to 12.

Preferred examples of the discotic core (D), the divalent linking group (L) and the polymerizable group (P) are respectively (D1) to (D15), (L1) to (L25) and (P1) to (P18) described in Japanese Laid-Open Patent Publication (Tokkai) No. 2001-4837; and the descriptions regarding the discotic core (D), the divalent linking group (L) and the polymerizable group (P) may be preferably applicable to this embodiment.

In the second embodiment of the present invention, the composition preferably comprises a cholesteric liquid crystal having a polymerizable group. This is commercially available, and is exemplified by Paliocolor LC242 and Paliocolor LC756, available from BASF Japan.

In the second embodiment of the present invention, the cholesteric pitch of the optically anisotropic layer is 120 nm or less, more preferably 100 nm or less, and much more preferably 90 nm or less. There is no specific limitation on the lower limit value. The thickness of the optically anisotropic layer is 500 nm or more and 5 μm or less, more preferably 600 nm or more and 4 μm or less, and still more preferably 700 nm or more and 3 μm or less. Too large pitch undesirably increases light leakage in the black state, and consequently degrades the contrast. Too large thickness also undesirably thickens the polarizer plate, or degrades ripening. On the contrary, too small thickness beyond the above-described range undesirably makes nonconformity in the film thickness more distinctive.

In the second embodiment of the present invention, the cholesteric pitch is adjustable based on types and amount of addition of the chiral agent. For the purpose of reducing the cholesteric pitch, it is necessary to select a chiral agent having a large as possible helical twisting power, and to increase the amount of addition of the chiral agent. To make it possible to add a large amount of chiral agent, the chiral agent preferably contains at least one reactive group. The reactive group is preferably an ethylenic unsaturated group, and in partiular (meth)acrylic group. More specifically, the chiral agents described in EP1388538 A1, pages 16 and 17, can preferably be used.

In the second embodiment of the present invention, when the layer formed by coating the cholesteric liquid-crystalline composition to a surface is irradiated with a non-polarized light to form an optically anisotropic layer, the obtained optically anisotropic layer becomes to be a negative c-plate, having the optical axis thereof in the direction of the normal line on the sheet, because no in-plane retardation is generated. On the other hand, when the layer formed by coating the cholesteric liquid-crystalline composition on a surface is irradiated with a polarized light to form an optically anisotropic layer, the obtained optically anisotropic layer becomes to be a biaxial medium because in-plane retardation is generated. According to the second embodiment, both of the optical compensation sheets respectively comprising the optically anisotropic layers which function as the negative C-plate and the biaxial medium can be used.

In the present invention, the optically anisotropic layer exhibits an optical characteristic such that retardation values measured by allowing light of a wavelength $\lambda$ nm to come respectively in a direction rotated by +40° and in a direction rotated by −40° with respect to a normal direction of a layer plane using an in-plane slow axis as a tilt axis (a rotation axis) are substantially equal to each other. Using a rod-like liquid-crystalline compound to form a film exhibiting biaxiality, it is necessary to align rod-like molecules in a twisted cholesteric orientation, or in a twisted hybrid cholesteric orientation in which the tilt angles of the molecules are varied gradually in the thickness-direction, and then to distort the twisted cholesteric orientation or the twisted hybrid cholesteric orientation by irradiation of polarized light. Examples of the method for distorting the orientation by the polarized light irradiation include a method of using a dichroic liquid-crystalline polymerization initiator (WO03/054111 A1), and a method of using a rod-like liquid-crystalline compound having in the molecule thereof a photo-alignable functional group such as cinnamoyl group (Japanese Laid-Open Patent Publication "Tokkai" No. 2002-6138). The present invention can adopt any of these methods.

In the second embodiment, in order to obtain the optically anisotropic layer as a negative C-plate, the optically anisotropic layer preferably exhibits a frontal retardation of substantially zero, and the optically anisotropic layer gives not zero retardation value for light of a wavelength $\lambda$ nm coming in a direction rotated by +40° with respect to a normal direction of a layer plane using an in-plane slow axis as a tilt axis (a rotation axis). The optically anisotropic layer exhibiting such optical characteristics can be produced as described in the above by allowing a layer formed of a composition capable of exhibiting a cholesteric phase to transfer into the cholesteric phase, and then by irradiating it with a non-polarized light.

For the case where the discotic liquid-crystalline molecule having a polymerizable group is used in the firstembodiment of the present invention, molecules of the liquid-crystalline compound may be fixed in to either orientation state of planar alignment or twisted alignment. The planar alignment means that the disk planes of the cores of the discotic liquid-crystalline molecules are parallel to the horizontal plane of the transparent substrate. However, in this specification, discotic molecules are not required to align with their cores strictly parallel to the horizontal plane, and the tilt angle less than 10° away from the horizontal plane is allowable.

In the first embodiment of the present invention, the optically anisotropic layer exhibits an Re of 5 to 250 nm, more preferably 10 to 100 nm, and much more preferably 20 to 80 nm. Rth, in total with Rth of the transparent substrate, is preferably 30 to 500 nm, more preferably 40 to 400 nm, and much more preferably 100 to 350 nm.

In the second embodiment of the present invention, the optical compensation sheet as a whole preferably has a frontal retardation (Re) of 0 to 70 nm, and exhibits a retardation Re measured for light coming in the direction 40° rotated with respect to a normal direction of a layer plane using an in-plane slow axis as a tilt axis (a rotation axis) of 30 to 150 nm. In an embodiment where the optically anisotropic layer functions as a biaxial medium, the optical compensation sheet as a whole more preferably exhibits a frontal retardation (Re) of 20 to 70 nm, and exhibits a retardation Re measured for light coming in the direction 40° rotated with respect to a normal direction of a layer plane using an in-plane slow axis as a tilt axis (a rotation axis) of 50 to 150 nm, and still more preferably exhibits the former of 30 to 60 nm, and the latter of 65 to 130 nm. In an embodiment where the optically anisotropic layer functions as a negative C-plate, the optical compensation sheet as a whole preferably exhibits a frontal retardation (Re) of 0 to 5 nm, and exhibits a retardation Re measured for light coming in the direction 40° rotated with respect to a normal direction of a layer plane using an in-plane slow axis as a tilt axis (a rotation axis) of 20 to 60 nm, and still more preferably exhibits the former of 0 to 3 nm, and the latter of 25 to 50 nm.

For the case where two or more optically anisotropic layers formed of the liquid-crystalline compositions are stacked in the present invention, there is no special limitation on combination of the liquid-crystalline compositions, so that the stack may be any of those formed of liquid-crystalline compositions all comprising discotic liquid-crystalline molecules, or formed of liquid-crystalline compositions all comprising rod-like liquid-crystalline molecules, or formed of liquid-crystalline compositions respectively comprising a discotic liquid-crystalline molecule and a rod-like liquid-crystalline molecule. There is no special limitation also on combination of orientation state of the individual layers, allowing stacking of the optically anisotropic layers having the same orientation status, or stacking of the optically anisotropic layer having different orientation states.

The optically anisotropic layer may be formed by applying a coating liquid, containing a liquid-crystalline compound and, if necessary, a polymerization initiator as described below or other additives, to a surface of an alignment layer. The solvent used for preparing the coating liquid is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination. The coating liquid can be applied by known techniques such as a dip coating method, an air knife coating method, a curtain coating method, a roller coating method, a wire-bar coating method, a gravure coating method, reverse gravure coating, die coating and an extrusion coating method (described in U.S. Pat. No. 2,681,294. Plural layers may be formed simultaneously. The simultaneous multi-layer coating method is described in U.S. Pat. No. 2,761,791, No. 2,941,898, No. 3,508,947 and No. 3,526,528, and on page 253 in "Coating Engineering", written by Harasaki Yuji, and published by Asakura Syoten in 1973.

[Fixing of Liquid-Crystalline Molecules in an Alignment State]

For producing the optical compensation sheet of the present invention, it is preferred that the liquid-crystalline molecules in an alignment state are fixed without disordering the state. Fixing is preferably carried out by the polymerization reaction of the polymerizable groups contained in the liquid-crystalline molecules. The polymerization reaction includes thermal polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970).

The amount of the photo-polymerization initiators to be used is preferably 0.01 to 20% by weight, more preferably 0.5 to 5% by weight on the basis of solids in the coating liquid. Irradiation for polymerizing the liquid-crystalline molecules preferably uses UV rays. The irradiation energy is preferably 20 mJ/cm$^2$ to 50 J/cm$^2$, more preferably 100 to 800 mJ/cm$^2$. Irradiation may be carried out under heating to accelerate the photo-polymerization reaction.

[Orientation Induced by Irradiation of Polarized Light (Photoinduced Orientation)]

In the optical compensation sheet of the present invention, the optically anisotropic layer may exhibit in-plane retardation attributed to photoinduced orientation with the aid of polarized light irradiation. The polarized light irradiation may be carried out at the same time with photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. For the purpose of obtaining a large retardation, it is preferable to carry out only the polarized light irradiation, or to carry out the polarized light irradiation first. The polarized light irradiation is preferably carried out under an inert gas atmosphere having an oxygen concentration of 0.5% or below. The irradiation energy is preferably 20 mJ/cm$^2$ to 10 J/cm$^2$, and more preferably 100 to 800 mJ/cm$^2$. The luminance is preferably 20 to 1000 mW/cm$^2$, more preferably 50 to 500 mW/cm$^2$, and still more preferably 100 to 350 mW/cm$^2$. There is no special limitation on types of the liquid-crystalline molecule to be hardened by the polarized light irradiation, wherein the liquid-crystalline molecule having an ethylenic unsaturated group as the reactive group is preferable.

The optically anisotropic layer exhibiting in-plane retardation attributed to the photoinduced orientation with the aid of the polarized light irradiation is excellent in particular for optical compensation of VA-mode liquid crystal display device.

For producing the optical compensation sheet of the present invention, after the coating liquid comprising a liquid-crystalline composition is applied to the surface of a particular polymer layer described later to thereby form the layer comprising the liquid-crystalline composition, and when the layer is hardened by irradiating ionizing radiation, it is preferable to adjust the film surface temperature of the layer to 70 to 160°. By allowing the hardening reaction to proceed within such film surface temperature range, motion of the reactive group at the surface of the polymer layer may be activated, so that the ratio of reaction between molecules in the layer formed of a liquid-crystalline composition and molecules having the reactive group in the polymer layer may be raised to thereby improve the adhesiveness therebetween. The film surface temperature is preferably higher by 1 to 30° C. than the glass transition temperature of the polymer compound composing the polymer layer, from the viewpoint of activating molecular motion, and more preferably higher by 5 to 25° C. By allowing the hardening reaction to proceed at the film surface temperature higher than the glass transition point of the polymer compound included in the polymer layer, the molecular mobility is distinctively improved. Although a film surface temperature before a hardening step might be measured by placing a thermocouple on the back surface of the substrate supporting the layer formed of a liquid-crystalline composition applied thereto, direct measurement of the film surface temperature of the layer is preferably carried out by using a non-contact radiation thermometer.

[Planar Alignment Agent]

At least one compound represented by a formula (1), (2) or (3) shown below may be added to the composition used for forming the optically anisotropic layer may comprise, in order to promote aligning the liquid-crystalline molecules horizontally. It is to be noted that the term "planar alignment" means that, regarding rod-like liquid-crystalline molecules, the molecular long axes thereof and a layer plane are parallel to each other, and, regarding discotic liquid-crystalline molecules, the disk-planes of the cores thereof and a layer plane are parallel to each other. However, they are not required to be exactly parallel to each other, and, in the specification, the term "planar alignment" should be understood as an alignment state in which molecules are aligned with a tilt angle against a layer plane less than 10 degree. The tilt angle is preferably from 0 to 5 degree, more preferably 0 to 3 degree, much more preferably from 0 to 2 degree, and most preferably from 0 to1 degree.

The formula (1) to (3) will be described in detail below.

Formula (1)

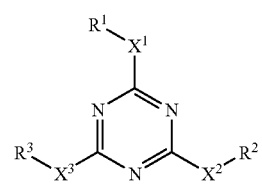

In the formula, R$^1$, R$^2$ and R$^3$ respectively represent a hydrogen atom or a substituent; and X$^1$, X$^2$ and X$^3$ respectively represent a single bond or a divalent linking group.

Formula (II)

[structure showing benzene ring with CO$_2$H and (R)$_m$ substituents]

In the formula, R represents a substituent, m is an integer from 0 to 5. When m is 2 or more, plural R are same or different each other.

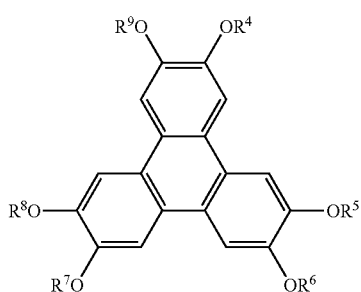

Formula (3)

In the formula, $R^4$, $R^5$, $R^6$, $R^7$, $R^8$ and $R^9$ respectively represent a hydrogen atom or a substituent.

Examples of the planar alignment agent, which can be used in the present invention, include those described in Japanese Laid-Open Patent Publication (Tokkai) No. 2005-099248 and the methods for preparing such compounds are described in the document.

The amount of the compound represented by the formula (1), (2) or (3) is preferably from 0.01 to 20 weight %, more preferably from 0.01 to 10 weight % and much more preferably from 0.02 to 1 weight %. As the planar alignment agent, one type compound may be selected from the formula (1), (2) or (3) and used singly, or two or more type of compounds may be selected from the formula (1), (2) or (3) and used in combination.

[Alignment Layer]

For aligning (desirably hybrid-aligning) liquid-crystalline molecules, a polymer layer may be used as an alignment layer. The alignment layer that can be employed in the present invention may be provided by rubbing a layer formed of an organic compound (preferably a polymer), oblique vapor deposition, the formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also known. The rubbing treatment may be carried out by rubbing a surface of a polymer layer several times in any direction with a paper or a cloth.

The alignment layer may be prepared by applying a coating liquid to a surface according to any known method such as a dip coating method, an air knife coating method, a curtain coating method, a roller coating method, a wire-bar coating method, a gravure coating method and an extrusion coating method (described in U.S. Pat. No. 2,681,294. Plural layers may be formed simultaneously. The simultaneous multi-layer coating method is described in U.S. Pat. No. 2,761,791, No. 2,941,898, No. 3,508,947 and No. 3,526,528, and on page 253 in "Coating Engineering", written by Harasaki Yuji, and published by Asakura Syoten in 1973.

In the present invention, it is preferable to use, as an alignment layer, a polymer layer formed by coating and drying a solution comprising at least one polymer compound, and it is more preferable to use, as an alignment layer, a polymer layer formed by coating and drying a solution comprising at least one polymer compound and a solvent composition containing 20% by mass or more of water. The alignment layer is preferably formed by using a polymer solution. Types of applicable polymer compound may be determined depending on the orientation (in particular, mean tilt angle) of the liquid-crystalline compound. For example, a polymer capable of not lowering the surface energy, which may be selected from polymers generally used for preparing alignment layers, can be used for aligning molecules of the liquid-crystalline compound horizontally. Examples of the polymer are described in various documents regarding liquid crystal cells or optical compensation sheets. Preferable examples include polyvinyl alcohol or modified polyvinyl alcohol; polyacrylic acid or copolymer with polyacrylic acid; polyvinylpyrrolidone; and cellulose or modified cellulose. Any of the alignment layers preferably contains a polymerizable group, for the purpose of improving adhesiveness between the alignment layer and the optically anisotropic layer formed on the surface of the alignment layer, and of avoiding peeling the optically anisotropic layer from the transparent substrate. The polymer having a polymerizable group may be selected from the group consisting of polymers comprising a repetitive unit having any polymerizable group in the side chain thereof and polymers having a cyclic group as a substituent group. It is more preferable to use an alignment layer capable of forming a chemical bond with the liquid-crystalline compound at the interface, and a particularly preferable example of such alignment layer is a modified polyvinyl alcohol, described in Japanese Laid-Open Patent Publication "Tokkaihei" No. 9-152509, which has an acrylic group introduced in the side chain thereof using acid chloride or Karenz MOI (product of Showa Denko K.K.). The thickness of the alignment layer is preferably 0.01 to 5 μm, and more preferably 0.05 to 2 μm.

According to the present invention, the optically anisotropic layer may be produced on a temporal orientation alignment layer, and may be transferred it onto the transparent substrate typically using a pressure-sensitive adhesive, but it is preferable that the process doesn't include the transferring step, from the viewpoint of productivity.

[Transparent Substrate]

According to the present invention, a substrate supporting the optically anisotropic layer may be used. The substrate is preferably transparent, and, in particular, preferably has a light transmission of not less than 80%. The thickness of the substrate is preferably from 10 to 500 micro meters, more preferably from 20 to 200 micrometers, and much more preferably from 35 to 110 micro meters.

The substrate is preferably formed of a polymer having a glass transition temperature (Tg) not less than 70° C., more preferably from 75 to 200° C., and much more preferably from 80 to 180° C. The transparent formed of such a polymer may have both of good thermal resistance and good molding processability.

The Re value of the substrate is preferably from −200 to the 100 nm, and the Rth value of the substrate is preferably from −100 to 100 nm. The Re value is more preferably from −50 to 30 nm, and much more preferably from −30 to 20 nm. Using cellulose acylate film as a substrate, the birefringence ration (Δn:nx−ny) of the film is preferably from 0 to 0.02, and the retardation value in the thickness direction, {(nx+ny)/2−nz}, of the film is preferably from 0 to 0.04. It is to be noted that, in the specification, a film, having a negative Re, always has a in-plane slow axis in a TD direction; and a film, having a negative Rth, always has a bigger refractive index in the thickness-direction than that in the plane.

Examples of the polymer included in the substrate, however not limited to them, include cellulose esters such as cellulose acetate, cellulose propionate and cellulose butyrate; polyolefins such as norbornene based polymers, poly(meth)acrylates such as polymethylmethacrylate, polycarbonates, polyesters and polysulfones. Commercially available polymers (for example, as a norbornene based polymer, "ARTON" provided by JSR and "ZEOROR" provided by ZEON CORPORATION) may be employed.

The substrate may also function as a protective film of a polarizing film, and in such a case, the substrate is preferably formed of a cellulose ester, and more preferably of a cellulose ester of a lower fatty acid. The term "lower fatty acid" means a fatty acid having 6 or less carbon atoms. The number of carbon atom is preferably 2 (cellulose acetate), 3 (cellulose propionate) or 4 (cellulose butyrate). Mixed fatty acid esters such as cellulose acetate propionate and cellulose acetate butyrate may be used. Among cellulose esters of a lower fatty acid, cellulose acetate is most preferred. The acylation degree of the cellulose ester is preferably from 2.50 to 3.00, more preferably from 2.75 to 2.95, and much more preferably from 2.80 to 2.90.

The viscosity average polymerization degree (DP) of the cellulose ester is preferably 250 or more, more preferably 290 or more. Additionally, the cellulose ester has a narrow molecular weight distribution (Mw/Mn; Mw means weight average molecular weight while Mn means number average molecular weight) by gel permeation chromatography. Specifically, the value of Mw/Mn is preferably from 1.0 to 5.0, more preferably from 1.3 to 3.0, and much more preferably from 1.4 to 2.0.

All of hydroxyl groups at 2-, 3, and 6-positions in cellulose ester are not substituted equally, and 6-position hydroxyl groups tend to be substituted poorly. According to the present invention, cellulose esters almost equally or more substituted at 6-position hydroxyl groups as same as 2- or 3-positions are preferably employed. The ration of substitution degree at the 6-position to the sum substitution degree at 2- and 3-positions is preferably from 30 to 40%, more preferably not less than 31% and much more preferably not less than 32%. The substitution degree at 6-position is preferably 0.88 and more. The hydroxyl groups at 6-position in cellulose esters may be substituted with any acyl group other than acetyl, having 3 or more carbon atoms, such as propionyl, butyryl, valeryl, benzoyl and acryloyl. The substitution degrees of hydroxyl groups at all positions can be obtained respectively by NMR measurement. Cellulose esters having a high substitution degree at 6-position can be prepared according to known synthetic roots such as the synthetic example No. 1 described on paragraphs 0043 to 0044, the synthetic example No. 2 described on paragraphs 0048 to 0049 and the synthetic example No. 3 described on 0051 to 0042 in Japanese Laid-Open Patent Publication (Tokkaihei) No. 11-5851.

The cellulose ester film may be added with a plasticizer for the purpose of improving the mechanical properties or of improving the drying speed. Phosphoric acid ester or carboxylic acid ester are used for the plasticizer. Examples of the phosphoric acid ester include triphenyl phosphate (TPP) and tricresyl phosphate (TCP). The carboxylic acid is represented by phthalic acid ester and citric acid ester. Examples of the phthalic acid ester include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric acid ester include O-acetyl citric acid triethyl (OACTE) and O-acetyl citric acid tributyl (OACTB). Examples of other carboxylic acid ester include butyl oleate, methylacetyl ricinolate, dibutyl sebacate, and various trimeritic esters. Of these, phthalate-ester-base plasticizers (DMP, DEP, DBP, DOP, DPP, DEHP) are prefearbly used. DEP and DPP are particularly preferable. Amount of addition of the plasticizer is preferably 0.1 to 25% by weight of the amount of cellulose ester, more preferably 1 to 20% by weight, and most preferably 3 to 15% by weight.

The cellulose ester film may be added with anti-degradation agent (for example, antioxidant, peroxide decomposing agent, radical inhibitor, metal destabilizing agent, acid trapping agent, amine). The anti-degradation agent is described in Japanese Laid-Open Patent Publication "Tokkaihei" No. 3-199201, ditto No. 5-1907073, ditto No. 5-194789 and ditto No. 5-271471, ditto No. 6-107854. Amount of addition of the anti-degradation agent is preferably 0.01 to 1% by weight of a solution (dope) to be prepared, and more preferably 0.01 to 0.2% by weight. The amount of addition less than 0.01% by weight results in only an unperceptible effect of the anti-degradation agent. The amount of addition exceeding 1% by weight may result in bleeding of the anti-degradation agent out onto the surface of the film. Particularly preferable examples of the anti-degradation agent include butylated hydroxytoluene (BHT) and tribenzylamine (TBA). It is also allowable to add a trace amount of dye in order to prevent light piping. From the viewpoint of transmissivity, it is preferable to select types and amount of the dye so as to adjust the transmissivity of light at 420 nm of 50% or more. The amount of addition of the dye is preferably 0.01 ppm to 1 ppm.

Any retardation controlling agent may be add to cellulose ester films in order to control Re or Rth values of the films. The amount of the retardation controlling agent is preferably from 0.01 to 20 weight parts, more preferably from 0.05 to 15 weight parts and much more preferably from 0.1 to 10 weight parts with respect to 100 weight parts of cellulose ester. Two or more types of retardation controlling agents may be used in combination. Examples or the like of the retardation controlling agents are described in pamphlets WO01/88574 and WO00/2619, and Japanese Laid-Open Patent Publication (Tokkai) Nos. 2000-111914 and 2000-275434.

A cellulose ester film may be produced by using a dope, or, in other words, a solution containing a cellulose ester and other ingredients, according to a solvent cast method. The dope is cast on a surface of a drum or a band and dried to evaporate the solvent, thereby forming a film. The solid content of dope before being cast is preferably from 10 to 40 weight %. The solid content is more preferably from 18 to 35 weight %. Multiple dopes may be cast simultaneously to form multiple cast layers. The surface of a drum or a band is preferably subjected to a mirror finish.

Various matters such as casting and drying techniques regarding solvent casting methods are described in U.S. Pat. Nos. 2,336,310, 2,367,603, 2,492,078, 2,492,977, 2,492,978, 2,607,704, 2,739,069 and 2,739,070, Britain patent Nos. 640, 731 and 736,892, Japanese Examined Patent Publication (Tokkosyo) Nos. 45-4554 and 49-5614, and Japanese Laid-Open Patent Publication (Tokkaisyo) Nos. 60-176834, 60-203430 and 62-115035.

The surface temperature of a drum or a band on to be cast is preferably 10° C. or less. The dope is preferably dried with wind for 2 seconds or more. The obtained film may be peeled off from the surface of the drum or band, and further dried to evaporate the residual solvent. Drying may be carried out according to the method, described in Japanese Examined Patent Publication (Tokkohei) No. 5-17844, in which the peeled-off film is dried with wind whose temperature is varied from 100 to 160° C. sequentially. Employing such a method can shorten the processing time from casting to peeling off. In order to carry out the method, the dope is required to turn into a gel at a surface temperature of a drum or band when being cast. Plural cellulose ester solutions being cast simultaneously, the solutions may be respectively cast from plural casting nozzles which are lined along a traveling direction apart from each other to form a multiple-layers film (ref. Japanese Laid-Open Patent Publication (Tokkaisyo) No. 61-158414 and Japanese Laid-Open Patent Publication (Tokkaihei) Nos. 1-122419 and 11-198285). The cellulose ester solutions can be cast from two casting nozzles to form a film (ref. Japanese Examined Patent Publication (Tokkosyo) Nos. 60-27562, 61-94724, 61-947245, 61-104813 and 61-158413 and Japanese Laid-Open Patent Publication (Tokkaihei) No. 6-134933). The casting method in which a flow of a high-viscosity cellulose ester solution is wrapped around by a low-viscosity cellulose ester solution and the high and low-viscosity solutions are extruded simultaneously may be employed (ref. Japanese Laid-Open Patent Publication (tokkaisyo) No. 56-162617.

The cellulose ester film can further be adjusted in the retardation by stretching. Stretching ratio is preferably falls in the range from 3 to 100%. Tenter stretching is preferable. In view of precisely controlling the slow axis, it is preferable to reduce as possible difference in the speed of the left and right tenter clips and in the timing of release. The stretching is described from line 8 on page 337 to line 8 on page 38 of WO01/88574.

The cellulose ester film may be subjected to a surface treatment. Examples of the surface treatment include corona discharge treatment, glow discharge treatment, flame treatment, acid treatment, alkali treatment and ultraviolet irradiation treatment. In view of keeping flatness of the film, it is preferable to adjust temperature of the cellulose ester film in the surface treatment to not higher than Tg (glass transition temperature), more specifically 150° C. or below.

The thickness of the cellulose ester film produced by a solvent casting is adjustable based on lip flow rate and line speed, or stretching or shrinkage. Because moisture permeability differs by major materials to be used, adjustment of the thickness makes it possible to adjust the moisture permeability within a range required for the protective film. The free volume of the cellulose ester film, produced by a solvent casting, is adjustable by temperature and time for drying. Also in this case, because moisture permeability differs by major materials to be used, adjustment of the free volume makes it possible to adjust the moisture permeability within a range required for the protective film. Hydrophilicity or hydrophobity of the cellulose ester film is adjustable using additives. Addition of a hydrophilic additive to the free volume can increase the moisture permeability, and conversely addition of a hydrophobic additive can decrease the moisture permeability. As described in the above, adjustment of the moisture permeability of the cellulose ester film by various methods makes it possible to adjust the moisture permeability within a range preferable for the protective film of the polarizer plate, makes the substrate for supporting the optically anisotropic layer also function as the protective film of the polarizer plate, and makes it possible to produce the polarizer plate exhibiting an optical compensation function with a low cost and a high productivity.

[Polarizer Plate]

The polarizer plate used for the liquid crystal display device of the present invention comprises a polarizer film and a pair of protective films holding the polarizer film in between. Examples of the polarizer film include iodine-containing polarizer film, dye-containing polarizer film using a dichroic dye, and polyene-base polarizer film. The iodine-containing polarizer film and the dye-containing polarizer film are generally fabricated using a polyvinyl-alcohol-base film. There is no special limitation on types of the protective film, wherein examples thereof include cellulose esters such as cellulose acetate, cellulose acetate butylate and cellulose propionate; polycarbonate; polyolefin; polystyrene; and polyester. The transparent protective film is generally supplied in a roll form, and is bonded with a long polarizer film in a continuous manner, preferably so as to align the longitudinal directions thereof. The axis of orientation of the protective film (slow axis) herein may be aligned to any direction. There is no special limitation also on the angle between the slow axis (axis of orientation) of the protective film and the absorption axis (axis of stretching) of the polarizer film, allowing appropriate setting depending on purpose of the polarizer plate.

The polarizer film and the protective film may be bonded using a water-base adhesive. Solvent contained in the water-base adhesive is dried in process of diffusion through the protective film. Larger moisture permeability of the protective film results in more rapid drying and in higher productivity, but too large moisture permeability allows more water to be included in the polarizer film depending on environment of use of the liquid crystal display device, and to thereby degrade the polarization ability. The moisture permeability of the optical compensation sheet is determined by the thickness of the polymer film (and the polymerizable liquid-crystalline molecule), free volume and hydrophobicity. The moisture permeability of the protective film of the polarizer plate is preferably fall within the range from 100 to 1000 $(g/m^2)/24$ hrs, and more preferably from 300 to 700 $(g/m^2)/24$ hrs.

In the present invention, one of the protective film of the polarizer film may also serve as the support of the optically anisotropic layer for the purpose of thinning, or may be none other than the optically anisotropic layer. The optically anisotropic layer and the polarizer film are preferably fixed by adhesion, in view of preventing misalignment of the optical axes and catching of dust or other foreign matters. The stacking by adhesion may adopt an appropriate method such as adhesion using a transparent adhesion layer. There is no special limitation on types of the adhesive, where those in no need of high temperature processes for the curing and drying in the adhesion procedure are preferable in view of preventing changes in optical characteristics of the components, and those in no need of long curing time or drying time are preferable. From this point of view, hydrophilic polymer-base adhesive and pressure-sensitive adhesion layer are preferably used.

It is also allowable to use, on one surface or on both surfaces of the polarizer film, a polarizer plate having formed therein a protective film aimed at various purposes, including water-proof property, equivalent to those of the protective film, or an appropriate functional layer such as anti-reflection layer and/or anti-glare layer aimed at preventing surface reflection. The anti-reflection layer can appropriately be formed typically as a light interference film such as a fluorine-containing polymer coated layer or a multi-layered metal deposited film. The anti-glare layer can be formed based on an appropriate system imparting fine irregularity on the surface, such as forming a coated layer of a particle-containing resin, embossing, sand blasting, etching and so forth, so as to allow surface reflective light to diffuse.

Examples of materials applicable to the particle include any one of, or two or more of inorganic particles, optionally having electro-conductivity, such as silica, calcium oxide, alumina, titania, zirconia, tin oxide, indium oxide, cadmium oxide and antimony oxide; and crosslinked or uncrosslinked organic fine particles composed of appropriate polymers such as polymethyl methacrylate and polyurethane, all of which having a mean particle size of 0.5 to 20 μm. The adhesive layer and the pressure-sensitive adhesive layer may have light diffusing property, as a result of containing these particles.

Optical properties and durability (short-term and long-term storability) of the inventive polarizing plate comprising the protective film, polarizer and transparent substrate are preferably equivalent to, or superior to performances of commercially-available super high contrast products (e.g., HLC2-

5618 from Sanritz Corporation). More specifically, the polarizing plate preferably has a visible light transmissivity of 42.5% or more, a degree of polarization of $\{(Tp-Tc)/(Tp+Tc)\}^{1/2} \geq 0.9995$ (where, Tp is parallel transmissivity and Tc is orthogonal transmissivity), a rate of change in the transmissivity of light before and after being allowed to stand at 60° C., 90% RH for 500 hours and at 80° C. in a dry atmosphere for 500 hours of 3% or less, more preferably 1% or less on the absolute value basis, and a rate of change in the degree of polarization of 1% or less, more preferably 0.1% or less on the absolute value basis.

There is no special limitation on display modes of the liquid crystal display device applied in the present invention, wherein the VA mode is preferably employed. It is to be understood that the liquid crystal display device used in the present invention is also effective in embodiments applied not only to the VA mode, but also to STN mode, TN mode and OCB mode.

[VA-Mode Liquid Crystal Cell]

The liquid crystal cell in the present invention is preferably of the vertically aligned mode (VA-mode). The VA-mode liquid crystal cell comprises an upper and lower substrates having rubbed surfaces opposed to each other, and liquid-crystalline molecule having a negative dielectric anisotropy enclosed therebetween. For example, the liquid crystal cell can be produced by using liquid crystal having a $\Delta n=0.0813$ and $\Delta \in =-4.6$ or around, and having a director, or so-called tilt angle, indicating the direction of orientation of the liquid crystal, of approximately 89°. In this case, the thickness d of the liquid crystal layer can be adjusted to 3.5 μm or around. Brightness of the white-level display varies depending on the product $\Delta n \cdot d$ of the thickness d (nm) of the liquid crystal layer and refractive index anisotropy $\Delta n$. In view of obtaining a maximum brightness, the thickness d of the liquid crystal layer is preferably adjusted within the range from 2 to 5 μm (2000 to 5000 nm), and $\Delta n$ within the range from 0.060 to 0.085.

The upper and lower substrates of the liquid crystal cell have transparent electrodes formed on the inner surface thereof, wherein the liquid-crystalline molecules in the liquid crystal layer are aligned nearly vertically to the surface of the substrates under the non-operating state under no voltage applied to the electrodes, so that state of polarization of light passing through the liquid crystal panel hardly changes. Because the absorption axis of the upper polarizer plate 37 and the absorption axis of the lower polarizer plate 36 of the liquid crystal cell cross almost normal to each other, the light cannot pass through the polarizer plate. In other words, the VA-mode liquid crystal display device can realize ideal black state under non-operating state. In contrast in the operating state, the liquid-crystalline molecules are inclined to the direction parallel with the surface of the substrates, so that the light passing through the liquid crystal panel can vary the state of polarization thereof, and can pass through the polarizer plate.

The description in the above showed the case in which the liquid-crystalline molecules having a negative dielectric anisotropy and responding normal to the direction of electric field was used, because the electric field was applied between the upper and lower substrates, whereas it is also allowable to use a liquid-crystalline material having a positive dielectric anisotropy for the case where the electrode is disposed only one of the substrates, and the electric field is applied in parallel with the surface of the substrates.

The VA-mode reside is characterized by its rapid response and high contrast. A problem, however, resides in that the contrast is lowered in oblique view, although the front contrast is high. The liquid-crystalline molecules in the black state are aligned vertically to the surface of the substrates, so that the liquid-crystalline molecules exhibit almost no birefringence in the front view, and consequently give a low transmissivity and high contrast. The liquid-crystalline molecules, however, exhibit birefringence in the oblique view. In addition, the angle of crossing of the absorption axes of the upper and lower polarizer plates is 90° orthogonal, but becomes larger than 90° in the oblique view. Due to two these factors, the display device becomes more likely to cause leakage of light in the oblique view, and tends to lower the contrast. In order to overcome this problem, the present invention adopts at least one optically anisotropic layer provided on the transparent substrate having a predetermined optical characteristic.

The liquid-crystalline molecules in the VA-mode device are inclined in the white state, wherein magnitude of the birefringence differs between when being observed from the oblique direction and from the counter direction, and this generates differences in the brightness and the color tone. To overcome this problem, it is preferable for the liquid crystal cell to adopt a multi-domain system. The multi-domain refers to a structure in which a plurality of domains differing in the state of orientation are formed in a single pixel. For example, the VA mode cell based on the multi-domain system has, in a single pixel, a plurality of domains differing in the angle of inclination of the liquid-crystalline molecules under applied voltage. The VA-mode liquid crystal cell based on the multi-domain system makes it possible to average the angle of inclination of the liquid-crystalline molecules under applied voltage, pixel by pixel, and thereby makes it possible to average the viewing angle characteristics. A plurality of domains differing in the direction of orientation of the liquid-crystalline molecules within a single pixel can be formed typically by a method of providing slits or projections to the electrodes, altering the direction of electric field, or producing non-uniformity in the electric field. Increase in the number of division may be successful in view of equalizing the viewing angle in all directions, but may reduce the transmissivity in the white state, so that quadrisection is preferable.

In the VA-mode liquid crystal display device, it is not often to add a chiral agent which is generally used for the twisted nematic mode (TN mode) liquid crystal display device, because the agent is causative of degradation in the dynamic response characteristic, but may be added in order to reduce the orientation failure. The liquid-crystalline molecules are not so responsive at the boundary of the regions where the orientation is divided. Because, according to the normally-black display, the black state can not be maintained, a problem of lowering in the luminance arises. Addition of the chiral agent to the liquid crystal contributes to shrinkage of the boundary region.

EXAMPLES

The paragraphs below will further detail the present invention referring to Examples. It is to be understood that materials, reagents, amount and ratio of use, operations and so forth shown in the Examples below may properly be modified without departing from the spirit of the present invention. The present invention is therefore not limited to the specific examples described below.

(Fabrication of Transparent Substrate S-1)

Fujitac TD80UF (product of Fuji Photo Film Co., Ltd., Re=3 nm, Rth=50 nm), a commercial acetate film,) was used as the transparent substrate S-1.

(Fabrication of Transparent Substrate S-2)

The composition below was placed in a mixing tank, stirred under heating so as to dissolve the individual components, to thereby prepare a cellulose acetate solution.

| Composition of cellulose acetate solution (%) | Inner layer | Outer Layer |
|---|---|---|
| Cellulose acetate, degree of acetylation = 60.9% | 20.89 | 19.78 |
| Triphenyl phosphate (plasticizer) | 1.63 | 1.54 |
| Biphenyl diphenyl phosphate (plasticizer) | 0.815 | 0.770 |
| Methylene chloride (first solvent) | 61.22 | 62.12 |
| Methanol (second solvent) | 14.83 | 15.03 |
| 1-Butanol (third solvent) | 0.313 | 0.320 |
| Silica (grain size = 20 nm) | 0.00 | 0.160 |
| Retardation enhancer S-2-1 | 0.302 | 0.280 |

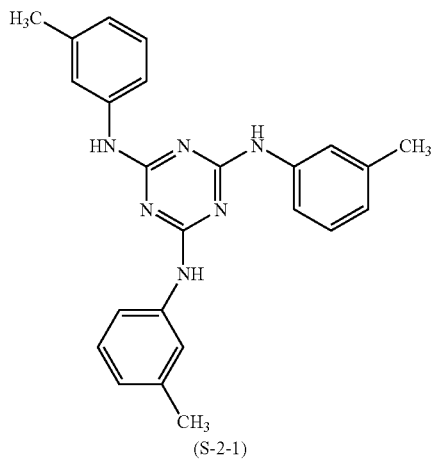

(S-2-1)

The obtained inner layer dope and the outer layer dope were cast using a three-layer, co-casting die onto a drum cooled at 0° C. The film containing residual solvent in a content of 70% by weight was peeled off from the drum, fixed to a pin tenter on both edges thereof, dried at 80° C. while being conveyed at a stretching ratio in the direction of conveyance of 110%, and further dried at 110° C. after a residual solvent content of 10% was reached. The film was further dried at 140° C. for 30 minutes, and thus-obtained cellulose acetate film containing a residual solvent in a content of 0.3% by weight (outer layer: 3 μm, inner layer: 74 μm, outer layer: 3 μm) was used as the transparent substrate S-2. The obtained film was found to have optical characteristics of Re=8 nm and Rth=82 nm.

(Preparation of Coating Liquid AL-1 for Alignment Layer)

The composition below was prepared, filtered through a polypropylene filter having a pore size of 30 μm, and the filtrate was used as a coating liquid AL-1 for the alignment layer. Modified polyvinyl alcohol used herein was described in Japanese Laid-Open Patent Publication "Tokkaihei" No. 9-152509.

| Composition of Coating Liquid for Alignment Layer | (%) |
|---|---|
| Modified polyvinyl alcohol AL-1-1 | 4.01 |
| Water | 72.89 |
| Methanol | 22.83 |
| Gultaraldehyde (crosslinking agent) | 0.20 |
| Citric acid | 0.008 |
| Citric acid monoethyl ester | 0.029 |
| Citric acid diethyl ester | 0.027 |
| Citric acid triethyl ester | 0.006 |

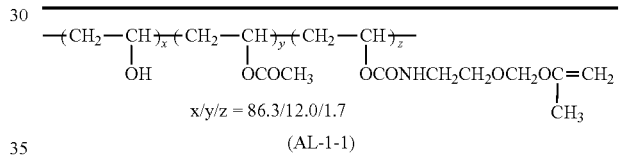

(AL-1-1)

(Preparation of Coating Liquid LC-1 for Optically Anisotropic Layer)

The composition below was prepared, filtered through a polypropylene filter having a pore size of 0.2 μm, and the filtrate was used as a coating liquid LC-1 for the optically anisotropic layer. LC-1-1 was synthesized according to a method described in EP1388538A1, page 21.

| Composition of Coating Liquid for Optically Anisotropic Layer | (%) |
|---|---|
| Rod-form liquid crystal (Paliocolor LC242, BASF Japan) | 26.66 |
| Ciral agent (Paliocolor LC756, BASF Japan) | 3.10 |
| Photo-polymerization initiator (LC-1-1) | 1.24 |
| Methyl ethyl ketone | 69.00 |

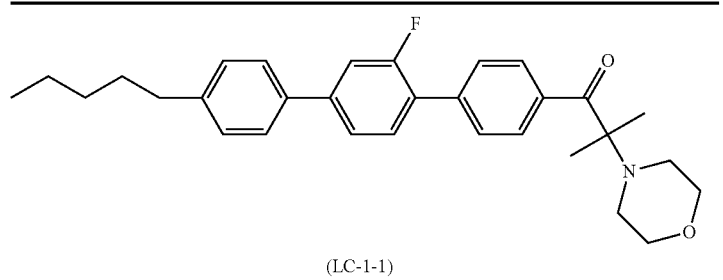

(LC-1-1)

(Preparation of Coating Liquid LC-2 for Optically Anisotropic Layer)

The composition below was prepared, filtered through a polypropylene filter having a pore size of 0.2 μm, and the filtrate was used as a coating liquid LC-2 for the optically anisotropic layer. LC-2-1 was synthesized according to a method described in Angew. Makromol. Chem., vol. 183, p. 45 (1990). LC-2-2 was synthesized by condensing 4-(6-acryloyloxyhexyloxy)benzoic acid synthesized by a method described in EP1174411 B1 with 4-propyl-cyclohexyl phenol (product of Kanto Kagaku). LC-2-3 was synthesized by condensing 4-(6-acryloyloxyhexyloxy)benzoic acid synthesized by a method described in EP1174411 B1 with 4-hydroxy-4'-(2-methylbutyl)biphenyl synthesized by a method described in WO01/040154 A1. LC-2-4 was synthesized by a method described in EP1389199A1. LC-2-5 was synthesized first by mesylating hydroxypropyl acrylate (product of Aldrich), allowing the product to react with 4-propylcyclohexyl phenol (product of Kanto Kagaku), and then added with hydrogen sulfide. LC-2-6 was synthesized by triflating 4-propylcyclohexyl phenol (product of Kanto Kagaku), and allowing the product to undergo Suzuki coupling reaction using phenyl boronic acid to thereby convert it into a biphenyl compound. The 4'-position of the obtained biphenyl was acylated using isobutyric chloride and aluminum chloride, the carbon atom at the α-position of carbonyl was bromated using bromine, and then converted into a hydroxyl group using an alkali.

| Composition of Coating Liquid for Optically Anisotropic Layer | (% by weight) |
|---|---|
| Rod-form liquid crystal (LC-2-1) | 6.67 |
| Rod-form liquid crystal (LC-2-2) | 2.60 |
| Chiral agent (LC-2-3) | 21.07 |
| Chiral agent (LC-2-4) | 1.67 |
| Chain transfer agent (LC-2-5) | 0.67 |
| Photopolymerization initiator (LC-2-6) | 0.67 |
| Methyl ethyl ketone | 66.65 |

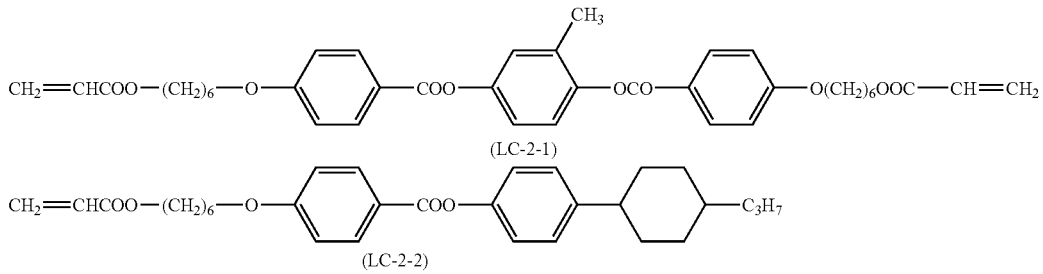

(LC-2-1)

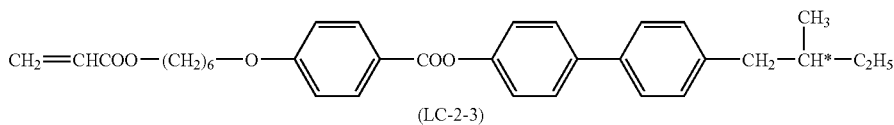

(LC-2-2)

(LC-2-3)

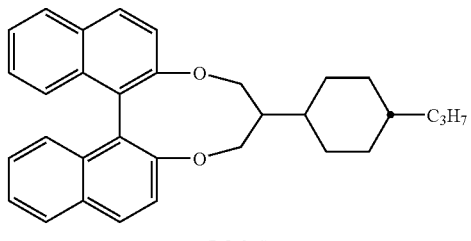

(LC-2-4)

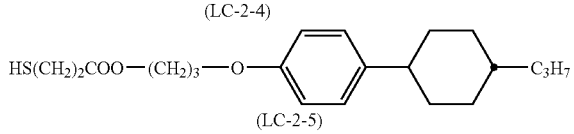

(LC-2-5)

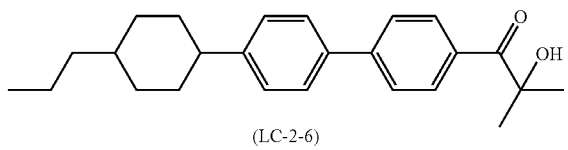

(LC-2-6)

(Preparation of Coating Liquid LC-3 for Optically Anisotropic Layer)

The composition below was prepared, filtered through a polypropylene filter having a pore size of 0.2 μm, and the filtrate was used as a coating liquid LC-3 for the optically anisotropic layer.

| Composition of Coating Liquid for Optically Anisotropic Layer | (%) |
|---|---|
| Rod-form liquid crystal (Paliocolor LC242, BASF Japan) | 25.11 |
| Chiral agent (Paliocolor LC756, BASF Japan) | 4.65 |
| Photo-polymerization initiator(LC-1-1) | 1.24 |
| Methyl ethyl ketone | 69.00 |

(Preparation of Coating Liquid LC-4 for Optically Anisotropic Layer)

The composition below was prepared, filtered through a polypropylene filter having a pore size of 0.2 μm, and the filtrate was used as a coating liquid LC-4 for the optically anisotropic layer.

| Composition of Coating Liquid for Optically Anisotropic Layer | (%) |
|---|---|
| Rod-form liquid crystal (Paliocolor LC242, BASF Japan) | 23.56 |
| Chiral agent (Paliocolor LC756, BASF Japan) | 6.20 |
| Photo-polymerization initiator (LC-1-1) | 1.24 |
| Methyl ethyl ketone | 69.00 |

(Polarized UV Irradiation Apparatus POLUV-1)

A polarized UV irradiation apparatus was fabricated by using an ultraviolet irradiation apparatus based on microwave-stimulated emission system, equipped with a D-bulb as a UV light source showing intense spectra at 350 to 400 nm (Light Hammer 10, 240 W/cm, product of Fusion UV Systems), and by disposing a wire-grid polarizing filter (ProFlux PPL02 (high transmissivity type), product of Moxtek) at a position 10 cm away from the surface of irradiation. The apparatus was found to have a maximum luminance of 400 mW/cm$^2$.

(One-Side Saponification of Cellulose Ester Film)

The cellulose ester film was allowed to pass through induction heater rolls of 60° C. to thereby raise the film surface temperature up to 40° C., and thereon an alkali solution having the formulation below was applied to the surface of the film using a bar coater in an amount of 14 ml/m$^2$. The film was kept stayed for 10 seconds under a steam-type far infrared heater (product of Noritake Co., Ltd.) heated at 110° C., and pure water was applied to the surface using the same bar coater in an amount of 3 ml/m$^2$. The film surface temperature at that time was 40° C. Next, cleaning with water using a fountain coater and removal of water using an air knife were repeated three times, and the film was kept stayed for 2 seconds in a drying zone at 70° C. for drying.

| Composition of Alkali Solution | (%) |
|---|---|
| Potassium hydroxide | 4.7 |
| Water | 14.7 |
| Isopropanol | 64.8 |
| Propylene glycol | 14.8 |
| Surfactant (SF-1) | 1.0 |

$C_{16}H_{33}O(CH_2CH_2O)_{10}H$ (SF-1)

Example 1-1

One surface of the transparent substrate S-1 was saponified by the above-described, one-side saponification process, and further thereon the coating liquid for alignment layer AL-1 was coated using a #14 wire bar coater, dried for 60 seconds under a hot air of 60° C., further dried for 150 seconds under a hot air of 90° C., to thereby form the alignment layer of 1.0 μm thick. Thus formed alignment layer was rubbed in the direction of the slow axis of the transparent substrate, and thereon the coating liquid for optically anisotropic layer LC-1 was applied to the surface of the alignment layer using a #8 wire bar coater, dried and ripened for 2 minutes while keeping a film temperature of 100° C., to thereby form the optically anisotropic layer having a uniform liquid crystal phase. Immediately after the ripening, the optically anisotropic layer, placed under a nitrogen atmosphere having an oxygen content of 0.3% or less, was irradiated with polarized UV light using POLUV-1 (luminance=200 mW/cm$^2$, irradiation energy=200 mJ/cm$^2$), while aligning the transmission axis of the polarizer plate in the direction of the fast axis of the transparent substrate so as to fix the optically anisotropic layer, to thereby produce the optical compensation sheet of Example 1-1. The optically anisotropic layer after the fixation was found to show no liquid crystal phase even under an elevated temperature. The thickness of the optically anisotropic layer was 3.4 μm.

Example 1-2

One surface of the transparent substrate S-2 was saponified by the above-described, one-side saponification process, and further thereon the coating liquid for alignment layer AL-1 was applied to the surface of the substrate using a #14 wire bar coater, dried for 60 seconds under a hot air of 60° C., further dried for 150 seconds under a hot air of 90° C., to thereby form the alignment layer of 1.0 μm thick. Thus formed alignment layer was rubbed in the direction of the slow axis of the transparent substrate, and thereon the coating liquid for optically anisotropic layer LC-1 was applied to the surface of the alignment layer using a #4 wire bar coater, dried and ripened for 1 minutes while keeping a film temperature of 100° C., to thereby form the optically anisotropic layer having a uniform liquid crystal phase. Immediately after the ripening, the optically anisotropic layer, placed under a nitrogen atmosphere having an oxygen content of 0.3% or less, was irradiated with polarized UV light using POLUV-1 (luminance=200 mW/cm$^2$, irradiation energy=200 mJ/cm$^2$), while aligning the transmission axis of the polarizer plate in the direction of the fast axis of the transparent substrate so as to fix the optically anisotropic layer, to thereby produce the optical compensation sheet of Example 1-2. The optically anisotropic layer after the fixation was found to show no liquid crystal phase even under an elevated temperature. The thickness of the optically anisotropic layer was 1.7 μm.

Comparative Example 1-1

One surface of the transparent substrate S-1 was saponified by the above-described, one-side saponification process, and further thereon the coating liquid for alignment layer AL-1 was applied to the surface of the substrate using a #14 wire bar coater, dried for 60 seconds under a hot air of 60° C., further dried for 150 seconds under a hot air of 90° C., to thereby form the alignment layer of 1.0 µm thick. Thus formed alignment layer was rubbed in the direction of the slow axis of the transparent substrate, and thereon the coating liquid for optically anisotropic layer LC-2 was applied to the surface of the alignment layer using a #3 wire bar coater, dried and ripened for 1 minute while keeping a film surface temperature of 60° C., to thereby form the optically anisotropic layer having a uniform liquid crystal phase. Immediately after the ripening, the optically anisotropic layer, placed under a nitrogen atmosphere having an oxygen content of 0.3% or less, was irradiated with polarized UV light using POLUV-1 (luminance=200 mW/cm$^2$, irradiation energy=200 mJ/cm$^2$), while aligning the transmission axis of the polarizer plate in the direction of the fast axis of the transparent substrate so as to fix the optically anisotropic layer, to thereby produce the optical compensation sheet of Comparative Example 1-1. The optically anisotropic layer after the fixation was found to show no liquid crystal phase even under an elevated temperature. The thickness of the optically anisotropic layer was 1.3 µm.

(Dry Adhesiveness)

Whether separation occurred or not was visually observed by the cross-cut method, and evaluated by three ranks shown below:

O: almost no separation observed;

Δ: 10% or more and less than 50% separation observed; and x: at least 50% separation observed.

(Wet Adhesiveness)

A 24×36 mm sample was immersed in hot water of 60° C. for 5 minutes, whether separation occurred or not was visually observed, and evaluated by three ranks shown below:

O: almost no separation observed;

Δ: 10% or more and less than 50% separation observed; and x: at least 50% separation observed.

(Measurement of Retardation)

Using KOBRA 21ADH (product of Oji Scientific Instruments), frontal retardation Re at 589 nm, and retardations Re(40) and Re(−40) were measured while inclining the sample by ±40° using the slow axis as the axis of rotation. Retardation of the optically anisotropic layer of the present invention was determined by subtracting the retardation of the substrate from the retardation of the optical compensation sheet as a whole at each angle.

Results of evaluation of adhesiveness for Examples 1-1, 1-2, and Comparative Example 1-1 were shown in Table 1-1, and measured retardation of the optically anisotropic layers in Examples 1-1, 1-2, and Comparative Example 1-1 were shown in Table 1-2.

TABLE 1-1

| Sample | Dry | Wet |
| --- | --- | --- |
| Example 1-1 | O | O |
| Example 1-2 | O | O |
| Comparative Example 1-1 | X | X |

TABLE 1-2

| Sample | Re | Re(40) | Re(−40) |
| --- | --- | --- | --- |
| Example 1-1 | 23.6 | 61.6 | 60.4 |
| Example 1-2 | 11.7 | 30.8 | 30.6 |
| Comparative Example 1-1 | 6.8 | 53.5 | 53.0 |

(Production of Polarizer Plate with Optical Compensation Sheet)

The stacks of each of the optical compensation sheets according to Examples 1-1, 1-2 of the first embodiment of the present invention and commercial Fujitac TD80UF (Fuji Photo Film Co., Ltd., Re=3 nm, Rth=50 nm) were immersed into a 1.5-N aqueous sodium hydroxide solution at 55° C. for 2 minutes. The samples were cleaned in a cleaning water bath at room temperature, and neutralized with a 0.1-N sulfuric acid at 30° C. The samples were again cleaned in a cleaning water bath at room temperature, and dried with a hot air of 100° C. After washed and neutralized again, two these saponified films were bonded onto both surfaces of the polarizer film as the protective films for the polarizer plate, in a roll-to-roll manner using a polyvinyl alcohol-base adhesive, to thereby fabricate an all-in-one type polarizer plate. Both of Examples according to the first embodiment of the present invention were found to be excellent in the productivity, and showed desirable surface conditions of the optically anisotropic layers. The optical compensation sheet of Comparative Example was not only insufficient in the adhesiveness, but also raised problems in degrading the productivity in the one-side saponification prior to the coating of the alignment layer, and in contaminating a saponification bath during processing of the polarizer plate.

Example 1-3

Production of VA-LCD Device

Figure 5:
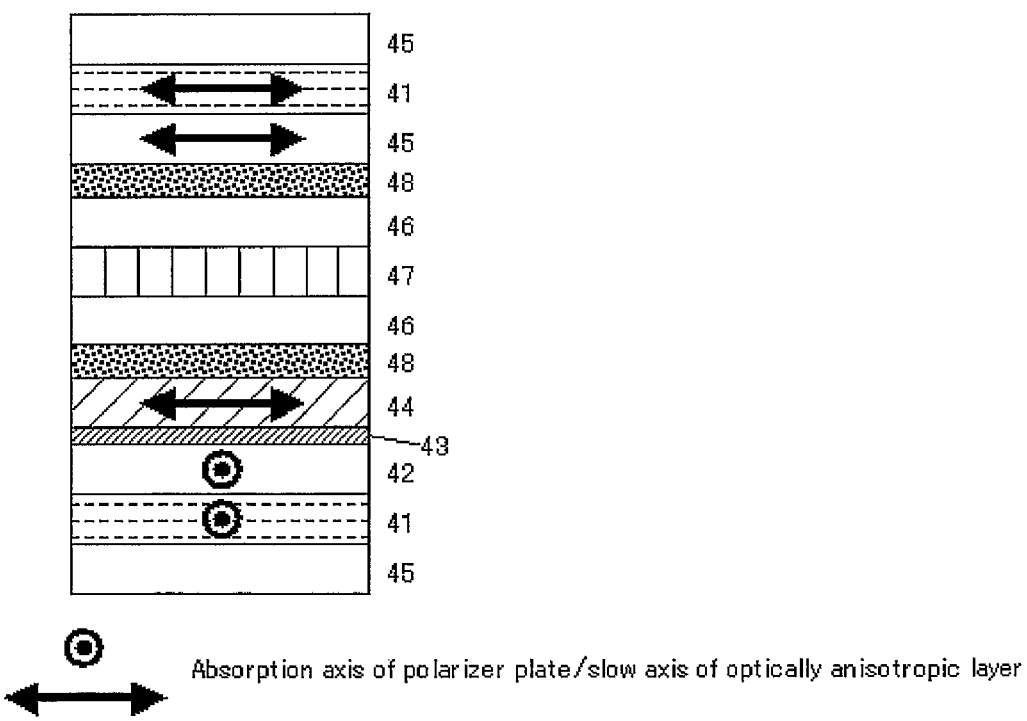
FIG. 5 is a schematic sectional view showing a layer configuration, together with the optical axes of the layers, of a liquid crystal display device fabricated in Example 1-3.

The upper and lower polarizer plates were peeled off from a commercial VA-LCD device (SyncMaster 173P, product of Samsung Electronics Co., Ltd.), and a general polarizer plate was placed on the upper side, and the polarizer plate with the optical compensation sheet of Example 1-1 was placed on the lower side so that the optically anisotropic layer was faced to the substrate glass of the liquid crystal cell, using a pressure-sensitive adhesive, to thereby produce the liquid crystal display device of the present invention. A schematic sectional view of thus-produced liquid crystal display device is shown in FIG. 5, together with angular relation of the optical axes of the individual layers. In FIG. 5, reference numeral 41 stands for the polarizing layer, 42 for the transparent substrate, 43 for the alignment layer, 44 for the optically anisotropic layer (41 to 44 configures the optical compensation sheet of the present invention), 45 for the polarizer plate protective film, 46 for the glass substrate for the liquid crystal cell, 47 for the liquid crystal cell, and 48 for the pressure-sensitive adhesive layer. The arrow in the polarizing layer 41 expresses the direction of absorption axis, the arrows in the optically anisotropic layer 44 and the protective film 45 express the direction slow axis, and the circles express that the arrows lay in the direction of normal line on the sheet of drawing.

(Evaluation of VA-LCD Device)

Figure 6:
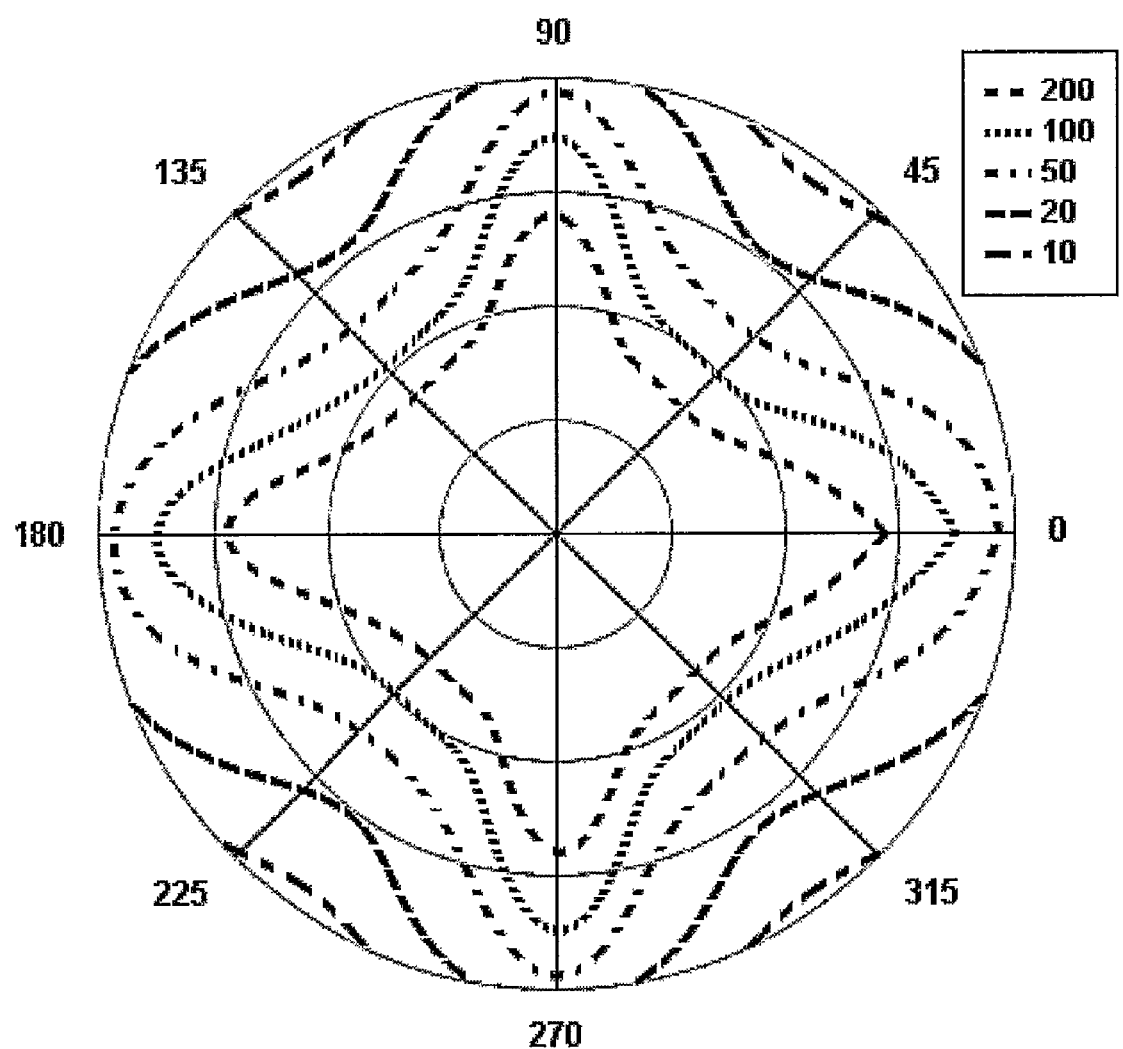
FIG. 6 is a drawing showing a contrast characteristic of the liquid crystal display device fabricated in Example 1-3.

The viewing angle characteristics of thus produced liquid crystal display device were measured using a viewing angle measuring instrument (EZ Contrast 160D, product of ELDIM). The display device was also visually observed particularly in a 45° oblique direction. The contrast characteristic of Example 1-3 measured by EZ Contrast was shown in FIG. 6, and results of the visual observation were shown in Table 1-3.

TABLE 1-3

| Sample | Results of Visual Observation |
|---|---|
| Example 1-3 | Small degree of color misalignment, desirable half-tone gradation characteristic |

Example 2-1

One surface of the transparent substrate S-1 was saponified by the above-described, one-side saponification process, and further thereon the coating liquid for alignment layer AL-1 was applied to the surface of the substrate using a #14 wire bar coater, dried for 60 seconds under a hot air of 60° C., further dried for 150 seconds under a hot air of 90° C., to thereby form the alignment layer of 1.0 μm thick. Thus formed alignment layer was rubbed in the direction of the slow axis of the transparent substrate, and thereon the coating liquid for optically anisotropic layer LC-3 was applied to the surface of the alignment layer using a #8 wire bar coater, dried and ripened for 2 minutes while keeping a film temperature of 100° C., to thereby form the optically anisotropic layer having a uniform liquid crystal phase. Immediately after the ripening, the optically anisotropic layer, placed under a nitrogen atmosphere having an oxygen content of 0.3% or less, was irradiated with polarized UV light using POLUV-1 (luminance=200 mW/cm$^2$, Irradiation energy=200 mJ/cm$^2$), while aligning the transmission axis of the polarizer plate in the direction of the fast axis of the transparent substrate so as to fix the optically anisotropic layer, to thereby produce the optical compensation sheet of Example 2-1. The optically anisotropic layer after the fixation was found to show no liquid crystal phase even under an elevated temperature. The thickness of the optically anisotropic layer was 3.4 μm.

Example 2-2

An optical compensation sheet of Example 2-2 was produced similarly to as described in Example 2-1, except that the coating liquid for optically anisotropic layer LC-3 was replaced with the coating liquid for optically anisotropic layer LC-4.

Comparative Example 2-1

An optical compensation sheet of Comparative Example 2-1 was produced similarly to as described in Example 2-1, except that the coating liquid for optically anisotropic layer LC-3 was replaced with the coating liquid for optically anisotropic layer LC-1.

Example 2-3

An optical compensation sheet of Comparative Example 2-3 was produced similarly to as described in Example 2-1, except that the bar gage of the wire bar coater used for applying the coating liquid for optically anisotropic layer LC-3 was altered to #4, and that the wire grid polarizing filter of POLUV-1 was removed. The thickness of the optically anisotropic layer was found to be 1.7 μm.

Example 2-4

An optical compensation sheet of Comparative Example 2-4 was produced similarly to as described in Example 2-2, except that the bar gage of the wire bar coater used for applying the coating liquid for optically anisotropic layer LC-4 was altered to #4, and that the wire grid polarizing filter of POLUV-1 was removed. The thickness of the optically anisotropic layer was found to be 1.7 μm.

Comparative Example 2-2

An optical compensation sheet of Comparative Example 2-2 was produced similarly to as described in Comparative Example 2-1, except that the bar gage of the wire bar coater used for applying the coating liquid for optically anisotropic layer LC-1 was altered to #4, and that the wire grid polarizing filter of POLUV-1 was removed. The thickness of the optically anisotropic layer was found to be 1.7 μm.

(Measurement of Retardation)

Frontal retardation Re at 589 nm, retardations Re(40) and Re(−40) under inclination of the sample by ±40° using the slow axis as an axis of rotation were measured using KOBRA 21ADH (product of Oji Scientific Instruments).

(Measurement of Cholesteric Pitch)

Cholesteric pitch was measured using a sectional TEM (transmission electron microscope).

Results of measurement of retardation and cholesteric pitch of Examples 2-1 to 2-4, and Comparative Examples 2-1 and 2-2 were shown in Table 2-1.

TABLE 2-1

| Sample | Re | Re(40) | Re(−40) | Cholesteric Pitch |
|---|---|---|---|---|
| Example 2-1 | 21.7 | 72.3 | 70.0 | 91 nm |
| Example 2-2 | 18.3 | 68.1 | 66.2 | 63 nm |
| Example 2-3 | 3.2 | 42.9 | 40.3 | 92 nm |
| Example 2-4 | 2.9 | 41.3 | 38.9 | 61 nm |
| Comparative Example 2-1 | 31.1 | 83.5 | 81.2 | 141 nm |
| Comparative Example 2-2 | 3.1 | 40.2 | 39.5 | 143 nm |

(Production of Polarizer Plate with Optical Compensation Sheet)

The optical compensation sheets of Examples 2-1 to 2-4 according to the second embodiment of the present invention, and of Comparative Examples 2-1 and 2-2, and commercial Fujitac TD80UF (Fuji Photo Film Co., Ltd., Re=3 nm, Rth=50 nm) were immersed into a 1.5-mol/L aqueous sodium hydroxide solution at 55° C. for 2 minutes. The samples were cleaned in a cleaning water bath at room temperature, and neutralized with a 0.05-mol/L sulfuric acid at 30° C. The samples were again cleaned in a cleaning water bath at room temperature, and dried with a hot air of 100° C. After washed and neutralized again, two these saponified films were bonded onto both surfaces of the polarizer film as the protective films for the polarizer plate, in a roll-to-roll manner using a polyvinyl alcohol-base adhesive, to thereby produce an all-in-one-type polarizer plate. All Examples according to the second embodiment of the present invention were found to be excellent in the productivity, and showed a desirable surface condition of the optically anisotropic layer.

Example 2-5

Production of VA-LCD Device

Figure 7:
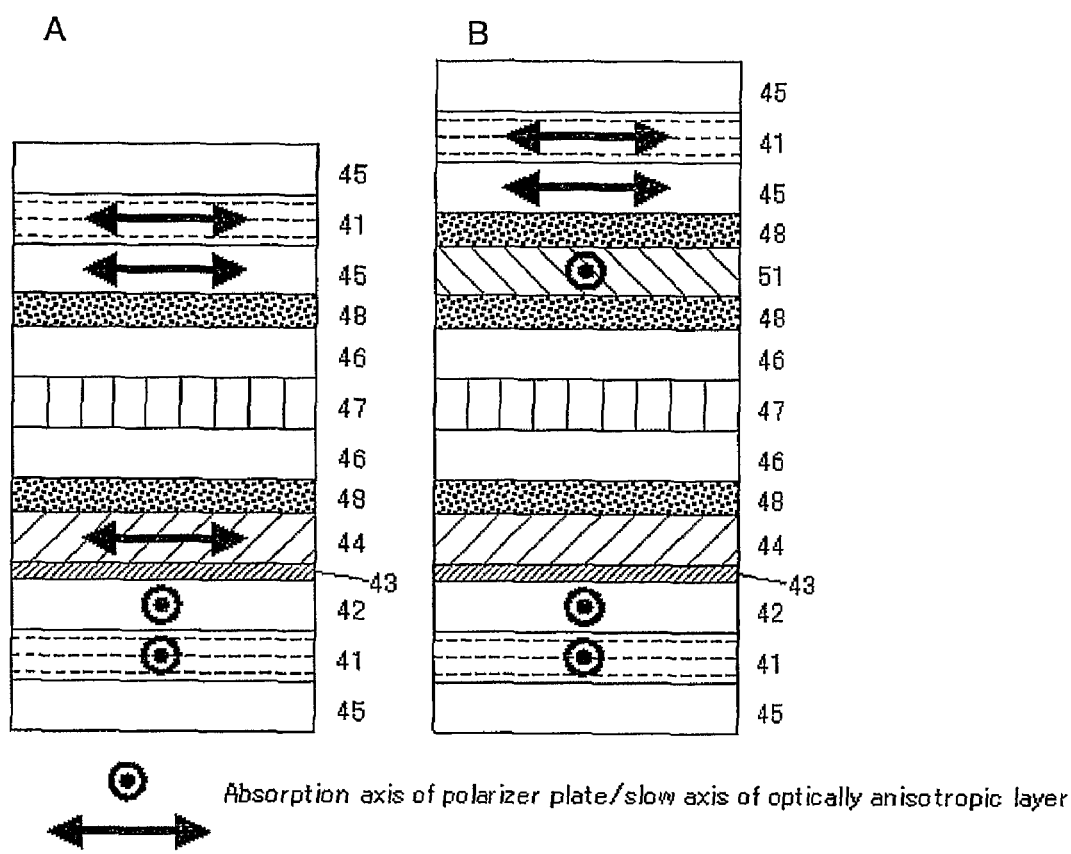
FIGS. 7A and 7B are schematic sectional views showing layer configurations, together with the optical axes of the layers, of the liquid crystal display devices fabricated in Examples 2-5 to 2-8, and Comparative Examples 2-3 and 2-4.

The upper and lower polarizer plates were peeled off from a commercial VA-LCD device (SyncMaster 173P, product of Samsung Electronics Co., Ltd.), and a general polarizer plate was placed on the upper side, and the polarizer plate with the optical compensation sheet of Example 2-1 was placed on the lower side so that the optically anisotropic layer was faced to the substrate glass of the liquid crystal cell, using a pressure-sensitive adhesive, to thereby produce the liquid crystal display device of the present invention. A schematic sectional view of thus-produced liquid crystal display device is shown in FIG. 7A, together with angular relation of the optical axes of the individual layers. In FIG. 7A, reference numeral 41 stands for the polarizing layer, 42 for the transparent substrate, 43 for the alignment layer, 44 for the optically anisotropic layer (41 to 44 configures the optical compensation sheet of the present invention), 45 for the polarizer plate protective film, 46 for the glass substrate for the liquid crystal cell, 47 for the liquid crystal cell, and 48 for the pressure-sensitive adhesive layer. The arrow in the polarizing layer 41 expresses the direction of absorption axis, the arrows in the optically anisotropic layer 44 and the protective film 45 express the direction slow axis, and the circles express that the arrows lay in the direction of normal line on the sheet of drawing.

Example 2-6

A liquid crystal display device of Example 2-6 was produced similarly to as described in Example 2-5, except that the polarizer plate with the optical compensation sheet of Example 2-2 of the present invention was used as the lower polarizer plate in Example 2-5.

Comparative Example 2-3

A liquid crystal display device of Comparative Example 2-3 was produced similarly to as described in Example 2-5, except that the polarizer plate with the optical compensation sheet of Comparative Example 2-1 of the present invention was used as the lower polarizer plate in Example 2-5.

Example 2-7

Fabrication of VA-LCD Device

The upper and lower polarizer plates were peeled off from a commercial VA-LCD device (SyncMaster 173P, product of Samsung Electronics Co., Ltd.), the polarizer plate with the optical compensation sheet of Example 2-3 of the present invention was bonded, using a pressure-sensitive adhesive, on the lower side so that the optically anisotropic layer was faced to the substrate glass of the liquid crystal cell, and an optical compensation sheet composed of a commercial uniaxially stretched Arton (Re=140 nm) was bonded, using a pressure-sensitive adhesive, on the upper side so that the uniaxially stretched Arton is faced to the substrate glass of the liquid crystal cell, to thereby fabricate the liquid crystal display device of the present invention. A schematic sectional view of thus produced liquid crystal display device is shown in FIG. 7B, together with the angular relation of the optical axes of the individual layers, wherein the layers same as those in FIG. 7A were given with the same reference numerals. Also meaning of the arrows shown in the layers are the same. In FIG. 7B, reference numeral 51 stands for a uniaxially-stretched optical compensation sheet.

Example 2-8

A liquid crystal display device of Example 2-8 was produced similarly to as described in Example 2-7, except that the polarizer plate with the optical compensation sheet of Example 2-4 of the present invention was used as the lower polarizer plate in Example 2-7.

Comparative Example 2-4

A liquid crystal display device of Comparative Example 2-4 was produced similarly to as described in Example 2-7, except that the polarizer plate with the optical compensation sheet of Comparative Example 2-2 of the present invention was used as the lower polarizer plate in Example 2-7.

(Evaluation of VA-LCD Device)

Figure 8:
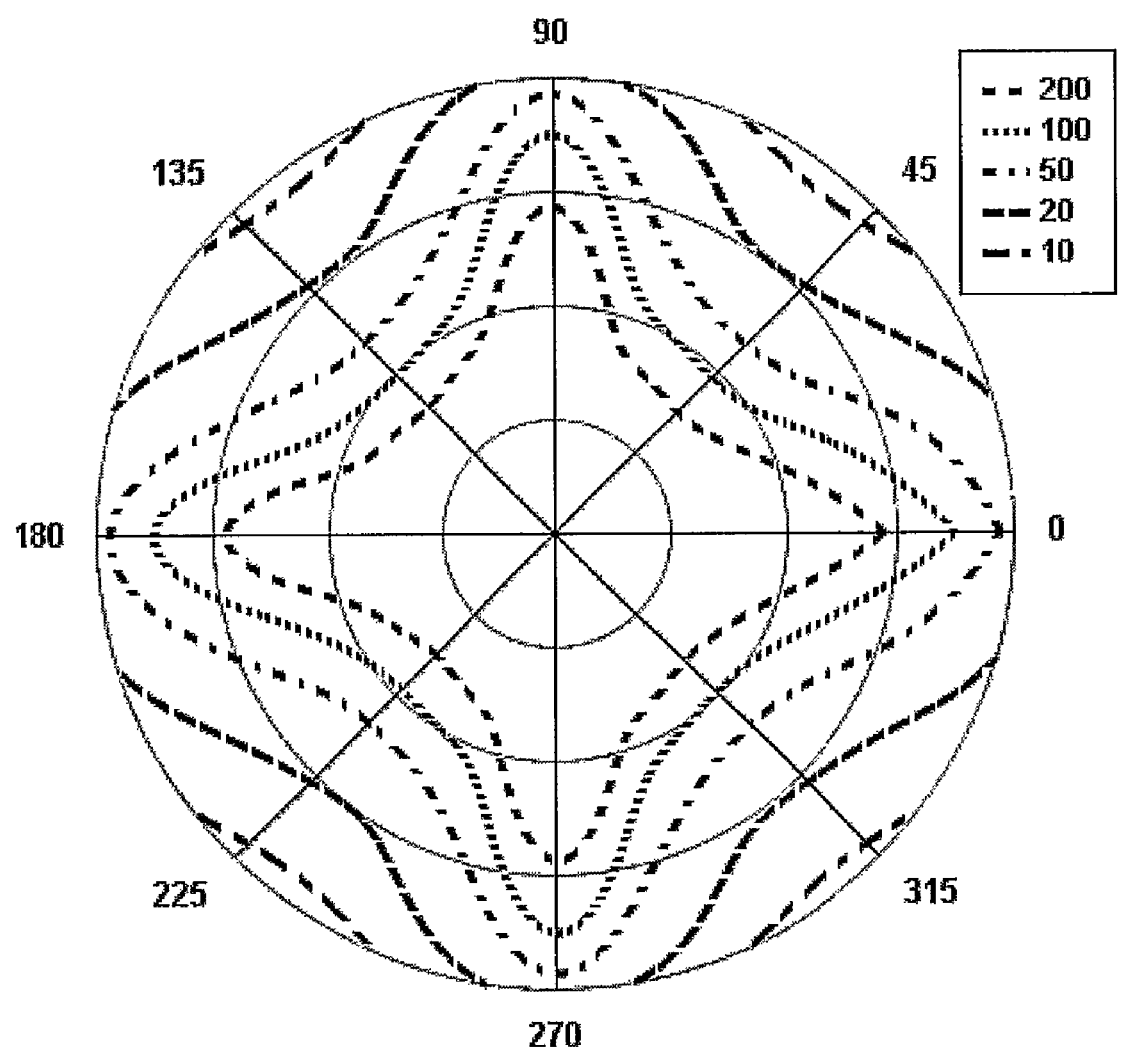
FIG. 8 is a drawing showing a contrast characteristic of the liquid crystal display device fabricated in Example 2-5.

The viewing angle characteristics of thus produced liquid crystal display device were measured using a viewing angle measuring instrument (EZ Contrast 160D, product of ELDIM). The display device was also visually observed particularly in a 45° oblique direction. Contrast characteristic of Example 2-5 measured by EZ Contrast was shown in FIG. 8, and contrast values for Examples 2-5 to 2-8, and Comparative Examples 2-1 and 2-2 measured by EZ Contrast were shown in Table 2-2.

TABLE 2-2

| Sample | Front Contrast |
|---|---|
| Example 2-5 | 706 |
| Example 2-6 | 695 |
| Comparative Example 2-3 | 623 |
| Example 2-7 | 734 |
| Example 2-8 | 732 |
| Comparative Example 2-4 | 665 |

INDUSTRIAL APPLICABILITY

Use of the optical compensation sheet of the present invention makes it possible to optically compensate the liquid crystal cell without changing a conventional configuration of a liquid crystal display significantly, and the liquid crystal display device of the present invention using such optical compensation sheet can distinctively improve not only the display quality but also the viewing angle characteristics.

In particular, the optical compensation sheet of the first embodiment of the present invention exhibits an excellent level of adhesiveness between an alignment layer and an optically anisotropic layer formed of a liquid-crystalline composition, and, thus, it is no more necessary to transfer the optically anisotropic layer onto the transparent substrate, unlike the conventional optical compensation sheet, and separation of the layers and elution the layer into a saponification bath during saponification in the processing of the polarizer plate is avoidable. And, it is possible to produce an optical compensation sheet excellent in the productivity.

The liquid crystal display device comprising the optical compensation sheet of the second embodiment of the present invention is distinctively improved in the front contrast and the viewing angle characteristics.

CROSS-REFERENCE TO RELATED APPLICATIONS

This application claims benefit of priorities under 35 USC 119 to Japanese Patent Application Nos. 2004-378943 filed Dec. 28, 2004 and 2005-028806 filed Feb. 4, 2005.

The invention claimed is:

1. An optical compensation sheet comprising:
a transparent substrate,
a polymer layer formed on the transparent substrate by coating and drying a solution comprising a polymer compound and a solvent composition comprising 20% by weight or more of water; and
an optically anisotropic layer formed on the surface of the polymer layer by hardening a liquid crystal layer comprising at least one liquid-crystalline compound under irradiation of ionizing radiation at a film surface temperature from 70 to 160° C.;
wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis);
wherein the film surface temperature of the liquid crystal layer, when being irradiated with ionizing radiation, is higher by 1 to 30° C. than the glass transition temperature of the polymer compound, and
wherein the liquid-crystalline compound exhibits a cholesteric liquid crystallinity.

2. The optical compensation sheet of claim 1, wherein the liquid-crystalline compound is a polymerizable liquid-crystalline compound having at least one reactive group, and the optically anisotropic layer is a layer formed by carrying out reaction of the reactive group under heating and/or irradiation of ionizing radiation thereby hardening the liquid crystal layer.

3. The optical compensation sheet of claim 1, wherein the solution comprises at least one polymer compound having a polymerizable group in a side chain thereof.

4. The optical compensation sheet of claim 1, wherein the liquid-crystalline compound is a polymerizable liquid-crystalline compound having at least one ethylenic unsaturated group, and the optically anisotropic layer is a layer formed by carrying out reaction of the ethylenic unsaturated group under irradiation of polarized ultraviolet light thereby hardening the liquid crystal layer.

5. The optical compensation sheet of claim 1, wherein the transparent substrate comprises at least one polymer selected from the group consisting of cellulose based polymers and cycloolefin based polymers.

6. The optical compensation sheet of claim 1, used for optical compensation of a liquid crystal cell comprising a pair of substrates disposed facing each other and a liquid crystal layer held between said pair of substrates, comprising a liquid crystal material, liquid-crystalline molecules of said liquid crystal material being aligned substantially normal to the surfaces of said pair of substrates.

7. The optical compensation sheet of claim 1, wherein the optically anisotropic layer has a frontal retardation value of 5 to 250 nm.

8. A polarizing plate comprising a polarizing film and at least one optical compensation sheet as set forth in claim 1.

9. A liquid crystal display comprising at least one polarizing plate as set forth in claim 8.

10. The liquid crystal display of claim 9, employing a VA-mode.

11. A process for producing an optical compensation sheet comprising:
forming, on a transparent substrate, a polymer layer by coating and drying a solution comprising a polymer compound and a solvent composition comprising 20% by weight or more of water; and
forming an optically anisotropic layer by irradiating a liquid crystal layer, which comprises at least one liquid-crystalline compound, disposed on the surface of said polymer layer, with ionizing radiation at a film surface temperature of 70 to 160° C. so as to harden it,
wherein a frontal retardation (Re) value of the optically anisotropic layer is not zero, and the optically anisotropic layer gives substantially equal retardation values for light of a wavelength λ nm coming respectively in a direction rotated by +40° and in a direction rotated by −40° with respect to a normal direction of a layer plane using an in-plane slow axis as a tilt axis (a rotation axis);
wherein the film surface temperature of the liquid crystal layer, when being irradiated with ionizing radiation, is higher by 1 to 30° C. than the glass transition temperature of the polymer compound,
and wherein the liquid-crystalline compound exhibits a cholesteric liquid crystallinity.

* * * * *